(12) United States Patent
Miyazaki et al.

(10) Patent No.: US 7,948,653 B2
(45) Date of Patent: May 24, 2011

(54) PRINTING COLORIMETRIC INSTRUCTION METHOD AND PRINTER

(75) Inventors: Kentaro Miyazaki, Matsumoto (JP); Yoshihiko Matsuzawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 552 days.

(21) Appl. No.: 12/058,614

(22) Filed: Mar. 28, 2008

(65) Prior Publication Data
US 2008/0240829 A1 Oct. 2, 2008

(30) Foreign Application Priority Data
Mar. 28, 2007 (JP) ................. 2007-084480

(51) Int. Cl.
- *H04N 1/60* (2006.01)
- *G03F 3/08* (2006.01)
- *G03F 3/10* (2006.01)
- *G06K 9/00* (2006.01)

(52) U.S. Cl. ......... 358/1.9; 358/518; 358/527; 382/162; 382/167

(58) Field of Classification Search ................... 358/1.9, 358/2.1, 451, 1.18, 1.17, 1.16, 1.15, 1.14, 358/1.13, 527, 518, 520, 523; 382/162, 167, 382/274, 166, 164; 345/603, 604, 581, 619, 345/689, 589, 354, 346, 348, 431, 432
See application file for complete search history.

(56) References Cited

U.S. PATENT DOCUMENTS
2007/0146737 A1* 6/2007 Morimoto ................. 358/1.2

FOREIGN PATENT DOCUMENTS
| JP | 2001-287407 A | 10/2001 |
| JP | 2001-346058 A | 12/2001 |
| JP | 2002-094820 A | 3/2002 |
| JP | 2003-103762 A | 4/2003 |
| JP | 2003-125222 A | 4/2003 |
| JP | 2005-244801 A | 9/2005 |
| JP | 2006-112972 A | 4/2006 |

* cited by examiner

*Primary Examiner* — Charlotte M Baker
(74) *Attorney, Agent, or Firm* — Sughrue Mion, PLLC

(57) ABSTRACT

A printing calorimetric control device of the present invention is configured to comprise a reception section which receives a designation for a colorimetry position on a predetermined image; a printing control section which prints an image on a print medium on the basis of image data which represent the predetermined image; a determination section which determines a position when a colorimetry section is caused to perform colorimetry on the predetermined image printed on the print medium on the basis of the designation; a conveyance section which conveys the print medium for which printing has been completed on the basis of the position thus determined; and a colorimetric control section which acquires a colorimetry value of the colorimetry position of the designation by causing the colorimetry section to execute colorimetry on the basis of the position thus determined.

6 Claims, 15 Drawing Sheets

PRINTING COLORIMETRIC INSTRUCTION METHOD AND PRINTER

The entire disclosure of Japanese Patent Application No. 2007-084480, filed Mar. 28, 2007, is expressly incorporated by reference herein.

BACKGROUND

1. Technical Field

The present invention relates to a printing calorimetric instruction method and a printer.

2. Related Art

JP-A-2001-287407 discloses a printer device which comprises a calorimetric mechanism section which measures the colors of the paper supplied for printing and which measures the colors of the paper prior to the print operation by means of the calorimetric mechanism section.

An image which is printed on paper by a printer can be the target of colorimetry for various purposes such as calibration of the printer, for example. However, JP-A-2001-287407 does not include means for accurately measuring the image on the paper following the print processing. Further, thus far, in cases where the paper that has undergone the print processing is subjected to colorimetry by a colorimetry section, the work from the printing of the image until the colorimetry, namely, the requirement that the user set the paper in the prescribed position of the colorimetry section so that the colorimetry section is able to perform colorimetry on the object image in an exact position has been complicated and problematic.

Furthermore, in cases where the image is printed and measured in particular, although the user wishes to obtain a colorimetry value at the desired point by freely selecting the colorimetry target position on the image, with a printer that additionally possesses a colorimetry function section of the kind mentioned above, there has hitherto been no means of accurately and easily measuring the position desired by the user on the image.

SUMMARY

An advantage of some aspects of the present invention is to provide a printing calorimetric instruction method and a printer which are capable of accurately implementing the respective processes from the printing of the image to colorimetry as a series of work processes which reduce the burden on the user as much as possible and, in particular, which make it possible to accurately and easily perform colorimetry on the position on the image which the user desires.

The printing calorimetric instruction method of the invention, comprising: receiving a designation for a colorimetry position on a predetermined image; instructing to print an image on a print medium on the basis of image data which represent the predetermined image; determining a position when a colorimetry section is caused to perform colorimetry on the predetermined image printed on the print medium on the basis of the designation; and acquiring a colorimetry value of the colorimetry position of the designation by causing the colorimetry section to execute colorimetry on the basis of the position thus determined.

As one specific constitution of the invention, the printing calorimetric instruction method, performing a thumbnail display of the image on a predetermined input screen, and receiving a colorimetry position optionally selected on the thumbnail display.

As one specific constitution of the invention, the printing calorimetric instruction method, acquiring a reference value for the color of the colorimetry position of the designation, and the printing calorimetric instruction method further including; comparing the colorimetry value with the reference value, and judging whether the color of a printing result of the colorimetry position of the designation is normal on the basis of the comparison result.

As one specific constitution of the invention, the printing calorimetric instruction method, causing the colorimetry section to perform colorimetry on a color sample constituting a reference color of the colorimetry position of the designation, and receiving a colorimetry value of the color sample, and setting the colorimetry value of the color sample as the reference value.

As one specific constitution of the invention, the printing calorimetric instruction method, generating the reference value on the basis of a component value which corresponds with the colorimetry position of the designation in the image data.

As one specific constitution of the invention, the printing calorimetric instruction method, acquiring a permitted range of a difference between the colorimetry value for the colorimetry position of the designation and the reference value; and judging that the color of the printing result for the colorimetry position of the designation is normal in cases where the difference between the colorimetry value acquired by causing the colorimetry section to execute colorimetry and the reference value is within the permitted range.

As one specific constitution of the invention, the printing calorimetric instruction method, in cases where judging that the color of the printing result for the colorimetry position of the designation is not normal, instructing to print an image on the print medium on the basis of the image data once again after executing a instruction to restore operation on a print head used in the printing and/or correction processing to correct, in accordance with the comparison result, an ink amount discharged by the print head on the basis of the image data.

As one specific constitution of the invention, a printing calorimetric control device of the invention, a reception section receives a designation of the calorimetric position on a predetermined image. A printing control section prints an image on a print medium on the basis of image data which represent the predetermined image. A determination section determines a position when a colorimetry section is caused to perform colorimetry on the predetermined image printed on the print medium on the basis of the designation of the colorimetry position. A conveyance section conveys the print medium for which printing has been completed on the basis of the position thus determined; and a calorimetric control section acquires a colorimetry value of the colorimetry position of the designation by causing the colorimetry section to execute colorimetry on the basis of the position thus determined.

In other words, with the invention, if the user optionally designates a colorimetry position on the image, the position when the colorimetry section is caused to perform colorimetry on the image is automatically calculated after the printing of the image on the print medium and the conveyance of the print medium and the colorimetry by the colorimetry section are executed on the basis of the position thus calculated. Therefore, the printing of the image and the colorimetry of the position desired by the user are implemented as a series of work processes and are extremely easy and the user is able to accurately acquire the colorimetry value for the position in which the user actually wishes to perform colorimetry.

As one specific constitution of the invention, the reception section may perform a thumbnail display of the image on a predetermined input screen and may be capable of receiving a colorimetry position optionally selected on the thumbnail display. With a constitution of this kind, the user is able to freely designate a colorimetry position while looking at the thumbnail display and is therefore capable of performing colorimetry reliably on a point on the image in which colorimetry is desired.

In addition, the reception section acquires a reference value for the color of the colorimetry position of the designation. Furthermore, the printing calorimetric control device further includes a judgment section which compares the colorimetry value acquired by the calorimetric control section with the reference value, and judges whether the color of a printing result of the colorimetry position of the designation is normal on the basis of the comparison result. A reference value as it is intended here is an ideal value for the color of the printing result of the colorimetry position of the designation and the reception section is able to receive the reference value by means of a user entry operation via the input screen, for example. Various other methods for acquiring the reference value may be considered. The reception section may cause the colorimetry section to perform colorimetry on a color sample constituting a reference color of the colorimetry position of the designation and receive a colorimetry value of the color sample, and may set the colorimetry value as the reference value. Alternatively, the reception section may generate the reference value on the basis of a component value which corresponds with the colorimetry position of the designation in the image data.

With a constitution of this kind, the user is able to reliably judge whether the color of the position on the image optionally designated by the user has been reproduced using an ideal color on the print medium.

Although it would be ideal if the colorimetry value acquired by the calorimetric control section and the reference value completely matched in the comparison result, often no such match occurs and it is not realistic to immediately make a negative judgment in cases where there is not a complete match. Therefore, according to the invention, a permitted range of a certain magnitude is provided for a difference between the colorimetry value and reference value obtained as a result of the comparison and, if this difference falls within the permitted range, the judgment section judges that the color of the printing result of the colorimetry position of the designation is normal. The reception section acquires the permitted range of the difference between the colorimetry value for the colorimetry position of the designation and the reference value. The reception section receives a setting for the permitted range from the outside via the input screen, for example.

According to the invention, the judgment of a match or mismatch between the printing result and reference value is, in reality, carried out at the corresponding level. Further, supposing that the setting for the permitted range is received from the outside, the judgment of a match or mismatch between the printing result and the reference value can be performed with the accuracy required by the user.

In addition, in cases where it is judged by the judgment section that the color of the printing result for the colorimetry position of the designation is not normal, the print control section once again prints an image on the print medium on the basis of the image data after executing a restore operation on a print head used in the printing and/or correction processing to correct, in accordance with the comparison result, an ink amount discharged by the print head on the basis of the image data.

With this constitution, in cases where the color of the print result of the colorimetry position of the designation is not normal, because the image is reprinted with the cause of the abnormal print result eliminated or negated, a print result which is reproduced using ideal colors can ultimately be obtained.

Although the technological ideas of the invention have been described thus far by a category such as a printing calorimetric control device, an invention of a method which comprises processing steps which correspond with each of the parts which the device comprises and the invention of a program that allows a computer to execute functions corresponding with each of the parts which the device comprises can also be grasped. Moreover, the printing calorimetric control device may be constituted by one device (the printer) or may be constituted by a combination of a device which constitutes a printing and colorimetry instruction entity and a device which executes the printing and colorimetry in accordance with the instruction. In addition, the printing calorimetric control device may also be a device which integrates a printing section which executes printing and a colorimetry section which executes colorimetry.

As one specific constitution of the invention, the printer, comprising: a reception section which receives a designation for a colorimetry position on a predetermined image; a printing control section which prints an image on a print medium on the basis of image data which represent the predetermined image; a determination section which determines a position when a colorimetry section is caused to perform colorimetry on the predetermined image printed on the print medium on the basis of the designation; a conveyance section which conveys the print medium for which printing has been completed on the basis of the position thus determined; and a calorimetric control section which acquires a colorimetry value of the colorimetry position of the designation by causing the colorimetry section to execute colorimetry on the basis of the position thus determined.

DESCRIPTION OF EXEMPLARY EMBODIMENTS

Figure 1:
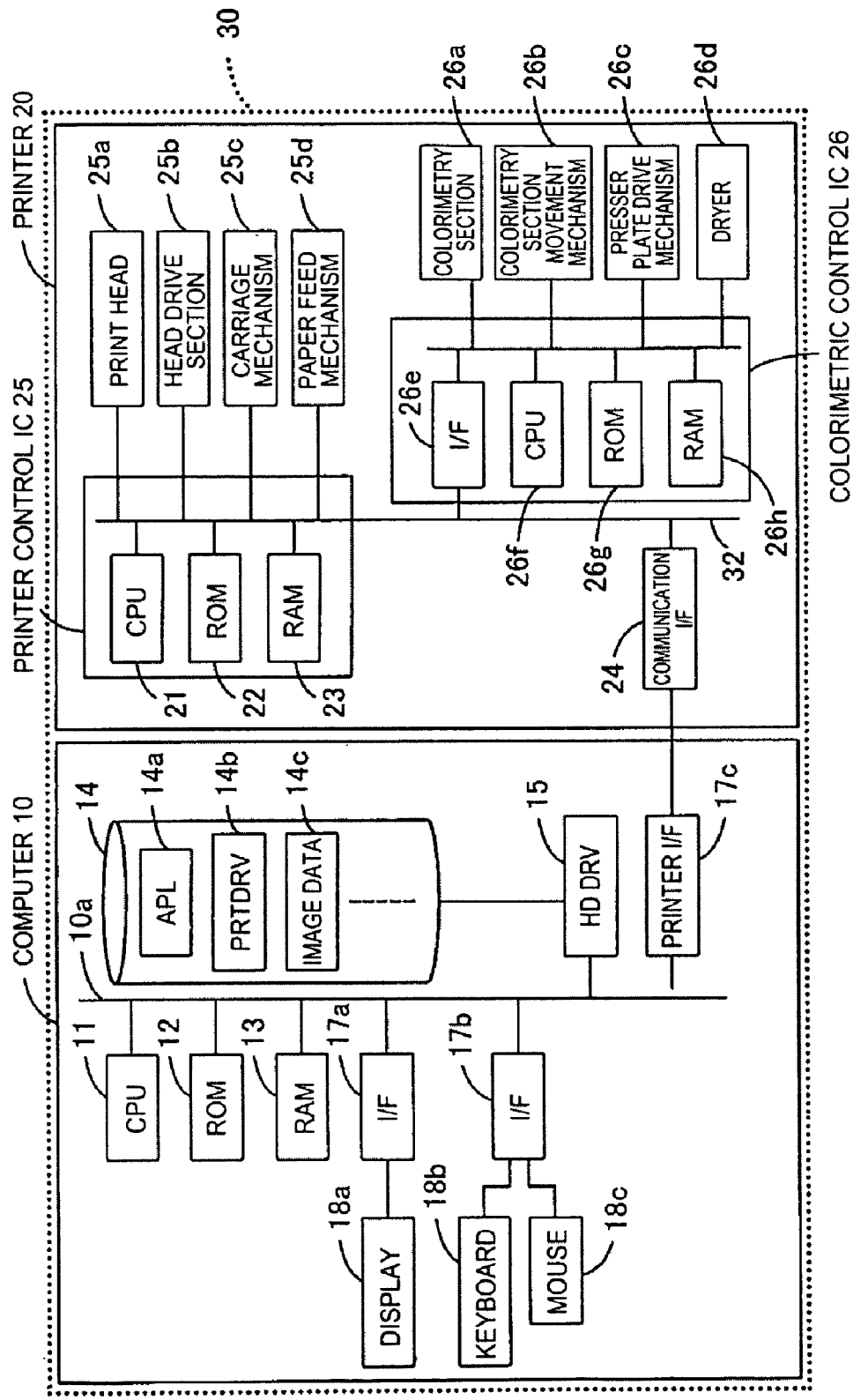
FIG. 1 is an example of a schematic block diagram of a computer and a printer.

An embodiment of the present invention will be described in the following order.
1. The overall constitution of an embodiment of the invention
2. First Embodiment
2-1. Condition setting for printing and colorimetry and so forth
2-2. Print processing/application side
2-3. Print processing/printer side
2-4. Colorimetry processing/application side
2-5. Colorimetry processing/printer side
2-6. Color evaluation processing
2-7. Printer exclusivity
3. Further embodiments
4. Summary 1. Overall Constitution of an Embodiment of the Invention FIG. 1 shows a computer 10 and a printer 20 which constitute a printing calorimetric control device 30. In the computer 10, a CPU 11 which is the backbone of the arithmetic processing controls the whole computer 10 via a system path 10a. A ROM 12, RAM 13, and various interfaces (I/F) 17a to 17c are connected to the path 10a and a hard disk (HD) 14 is connected via a hard disk drive (HDDRV) 15. The HD 14 stores an operating system (OS) and an application program (APL) 14a which are suitably transferred to the RAM 13 by the CPU 11 and executed thereby. Furthermore, the HD 14 is a storage area for storing image data 14c to be printed. A display 18a which displays an image corresponding with predetermined image data on the basis of these data is connected to the I/F 17a, a keyboard 18b and a mouse 18c are connected to an I/F 17b and the printer 20 is connected via a serial I/F cable, for example, to the printer I/F 17c.

The printer 20 is a printing device which is controlled by the computer 10. In this embodiment, the printer 20 comprises not only a function for printing on print paper but also a colorimetry function for performing colorimetry on printed matter. That is, printer 20 is a printer which is equipped with a colorimetry section. In printer 20, a communication I/F 24, a printer control IC 25, and a calorimetric control IC 26 and so forth are connected via a bus 32. The printer control IC 25 comprises a CPU 21, a ROM 22, and a RAM 23 and the calorimetric control IC 26 comprises an I/F 26e, a CPU 26f, a ROM 26g, and a RAM 26h. A communication I/F 24 (specified interface) is connected to the printer I/F 17c, and the computer 10 and printer 20 implement two-way communication via printer I/F 17c and communication I/F 24. The communication interface I/F 24 is able to receive raster data classified by ink type which are transmitted by the computer 10.

In the printer control IC 25, the CPU 21 executes processing in accordance with predetermined software (printer controller 250) which is stored in the ROM 22. The printer control IC 25 is an IC which mainly executes various control processes for print processing and which is connected to the respective parts which are a print head 25a, ahead drive section 25b, a carriage mechanism 25c, and a paper feed mechanism 25d, thereby controlling the respective parts.

The print head 25a comprises a plurality of ink cartridges which each correspond with a plurality of ink types (cyan (C), magenta (M), yellow (Y), black (K), light cyan (Lc), and light magenta (Lm), for example) and a plurality of nozzle arrays which are provided in correspondence with the respective ink types and forms an image on the print paper by discharging the ink that the ink cartridges are filled with as ink droplets from the nozzle array. The printer control IC 25 outputs printing voltage data which correspond with the raster data to the head drive section 25b. The head drive section 25b generates and outputs application voltage patterns (drive waveforms) which are to be applied to piezo elements which are contained in the respective nozzle arrays of the print head 25a from the application voltage data and discharges ink droplets (dots) for each ink type to the print head 25a.

The carriage mechanism 25c is a driving device which is controlled by the printer control IC 25 and which causes the carriage (not shown) to move reciprocatingly along a guide rail (not illustrated) which the printer 20 comprises. The print head 25a is installed in the carriage and the print head 25a moves reciprocatingly (scans) along the guide rail. The paper feed mechanism 25d feeds the print paper by means of a paper feed roller (not shown) at a predetermined speed in one direction (the paper feed direction) which is substantially orthogonal to the reciprocating direction (main scan direction) of the carriage as a result of being controlled by the printer control IC 25.

A printer that forms a printed image by means of a thermal printing or sublimation-type printing or another printing scheme or a line head printer may also be adopted as the printer 20.

In the calorimetric control IC 26, the CPU 26f executes processing in accordance with predetermined software stored in the ROM 26g (calorimetric controller 260). The calorimetric control IC 26 is an IC which mainly executes various control processes for colorimetry processing and which is connected to the respective parts which are a colorimetry section 26a, a colorimetry section movement mechanism 26b, a presser plate drive mechanism 26c, and a dryer 26d. The colorimetry section 26a is able to acquire, as a colorimetry value, a color value which consists of a plurality of color components L, a, and b on the basis of the L*a*b* color system (abbreviated to '*' hereinbelow) prescribed by the International Commission on illumination (CIE) by directing the color detection section toward the colorimetry target and the colorimetry section 26a outputs the colorimetry value thus acquired to the computer 10. The Lab color space is a uniform color space which is independent of the device. The color space for colorimetry may naturally also be a CIE-prescribed L*u*v* color space, a CIE-prescribed XYZ color space, or an RGB color space, or the like.

The colorimetry section movement mechanism 26b is a drive device which is controlled by the calorimetric control IC 26 and which causes the colorimetry section 26a to move reciprocatingly along the presser plate (described subsequently). The presser plate drive mechanism 26c is a drive device for pressing the print paper against the presser plate on the basis of the control by the calorimetric control IC 26. The dryer 26d is provided close to the colorimetry section 26a which performs processing to feed warm air to the print paper on the basis of the control of the calorimetric control IC 26 so that the image of the print paper is forcibly dried. That is, the printer 20 makes it possible to perform a series of processes such as the printing of an image on print paper, the drying thereof, and colorimetry of the image with one device.

Figure 2:
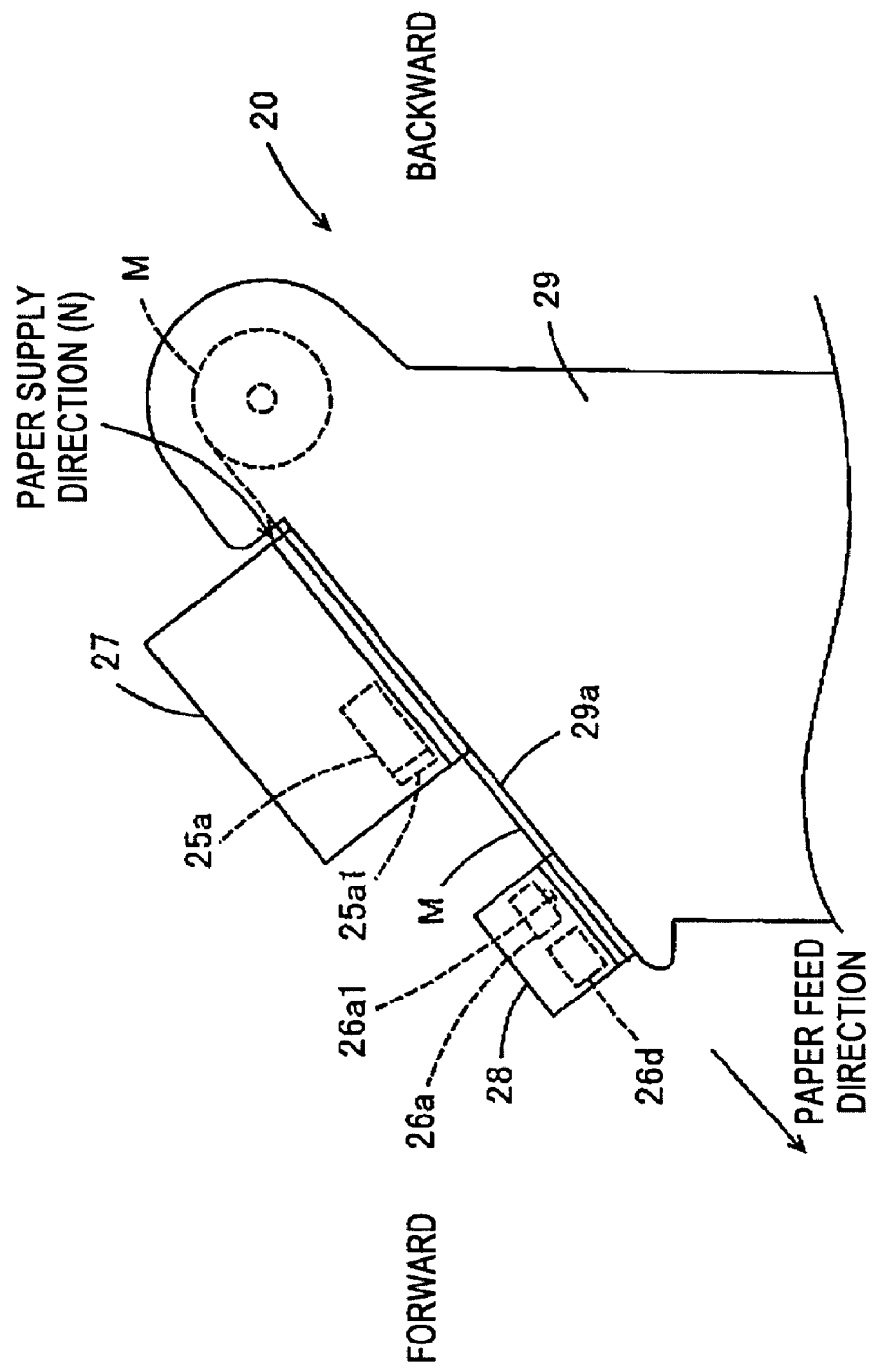
FIG. 2 is an example of an external side view of a printer.

FIG. 2 schematically shows the printer 20 from the side.

The printer 20 houses print paper M (rolled paper) close to the top of the main body 29 and feeds the print paper M in the paper feed direction substantially along an oblique surface 29a formed at the front of the main body 29. Furthermore, print paper N can also be fed in the paper feed direction substantially along the oblique plane 29a by supplying print paper N (cut sheet paper) which is cut sheet by sheet from the paper supply direction shown in FIG. 2 instead of a roll of paper. A casing 27 is provided in a predetermined position on the oblique surface 29a. The print head 25a is housed in the casing 27. The print head 25a moves in a direction perpendicular to the surface of FIG. 2 (the main scanning direction) along the guide rail (not shown). A cutter 25a1 is also attached to the print head 25a and the cutter 25a1 moves reciprocatingly together with the print head 25a.

A calorimetric drying unit 28 is installed in a predetermined position further downstream in the paper feed direction than the casing 27 on the oblique surface 29a. The calorimetric drying unit 28 is a part for housing the colorimetry section 26a and the dryer 26d in the calorimetric drying unit 28 and is attached so as to be parallel to the casing 27 in a determined position on the oblique surface 29a. In this embodiment, the calorimetric drying unit 28 houses the colorimetry section 26a upstream in the paper feed direction and houses the dryer 26d further downstream in the paper feed direction than the colorimetry section 26a. When the print paper M(N) is being fed, the print paper M(N) passes below the casing 27 and the calorimetric drying unit 28. The colorimetry section 26a orients the color detection section 26a1 toward the oblique surface 29a and is stopped in an initial position within the calorimetric drying unit 28 in a standby state. A white tile for calibrating the colorimetry section 26a is located below the color detection section 26a1 in the initial position. In this embodiment, the left edge of the left and right edges of the calorimetric drying unit 28 when facing in the paper feed direction (downstream) is the initial position of the colorimetry section 26a.

The colorimetry section 26a is capable of being moved reciprocatingly in the main scanning direction by the colorimetry section movement mechanism 26b. The presser plate (not shown) is installed between the oblique surface 29a and the height of movement of the colorimetry section 26a. The presser plate stands by in a position a predetermined distance apart from the oblique surface 29a and, as a result of being driven by the presser plate drive mechanism 26c with predetermined timing, the print paper M(N) which is fed below the calorimetric drying unit 28 is not pressed from above. A long hole is formed penetratingly in the presser plate in the main scanning direction and the colorimetry section 26a which moves as a result of the colorimetry section movement mechanism 26b is able to perform colorimetry on the image printed on the print paper M(N) as a result of the color detection section 26a1 being made to face the print paper M(N) on the oblique surface 29a via the long hole. The surface of the printer 20 along which the print paper M(N) is fed may also be a flat surface rather than an oblique surface such as that in FIG. 2.

Figure 3:
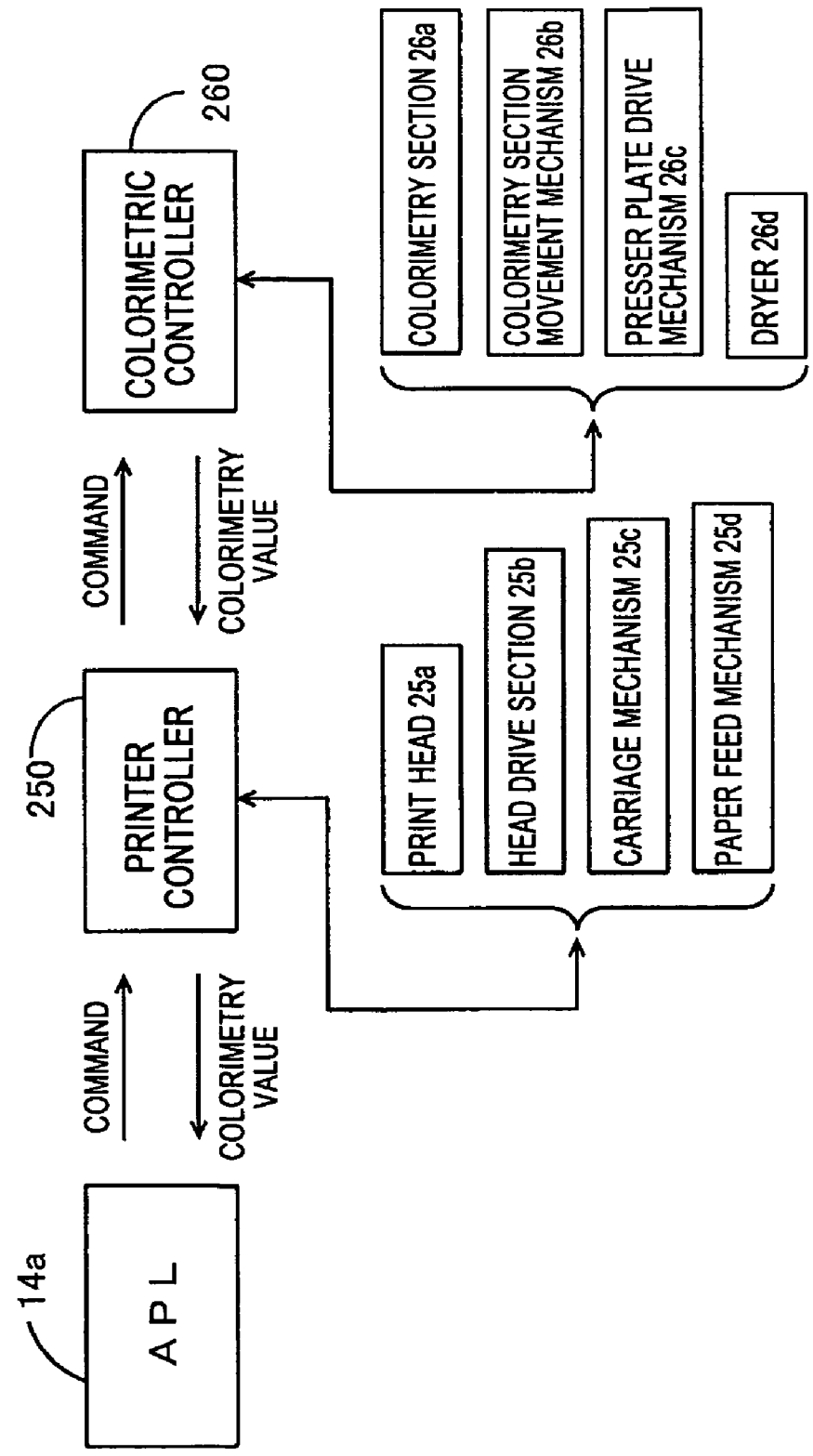
FIG. 3 is an example of a view which shows an inter-software instruction system.

FIG. 3 shows the inter-software instruction system and so forth of this embodiment. In this embodiment, the computer 10 is capable of instructing the printer 20 to perform image printing and colorimetry in accordance with the APL 14a (instruction section). In this case, the respective instructions (exclusive command, print command, colorimetry command, drying command, and colorimetry position definition command, and so forth, which will each be described subsequently) are all sent to the printer control IC 25 and constitute processing targets for the printer controller 250. The printer controller 250 executes processing which corresponds with the received commands as well as control of the respective parts, namely, of print head 25a, the head drive section 25b, the carriage mechanism 25c, and the paper feed mechanism 25d and, in cases where a command which is to be handed over to the colorimetric controller 260 is received, the printer controller 250 transmits this command to the calorimetric control IC 26. The calorimetric controller 260 executes processing which corresponds with the commands received by the colorimetric control IC 26 via the I/F 26e as well as control of the respective parts, namely, the colorimetry section 26a, the colorimetry section movement mechanism 26b, the presser plate movement mechanism 26c, and the dryer 26d. The colorimetry values acquired by the colorimetry section 26a are transmitted to the printer controller 250 by the calorimetric controller 260 and transmitted to the APL 14a by the printer controller 250.

2. First Embodiment

One embodiment which can be executed by using the constitution of the printing calorimetric control device 30 will be described next.

Here, an embodiment in which a certain color image (target image) is printed on a print medium and a position which is optionally designated by the user which is a position on the image is subjected to colorimetry (known as 'spot colorimetry') will be described. An image for which the state of being printed on a print medium (the respective pages of a distributed leaflet, poster, or periodical) is the final result, for example, is assumed as the target image.

2-1. Setting of Conditions for Printing and Colorimetry and so Forth

Figure 4:
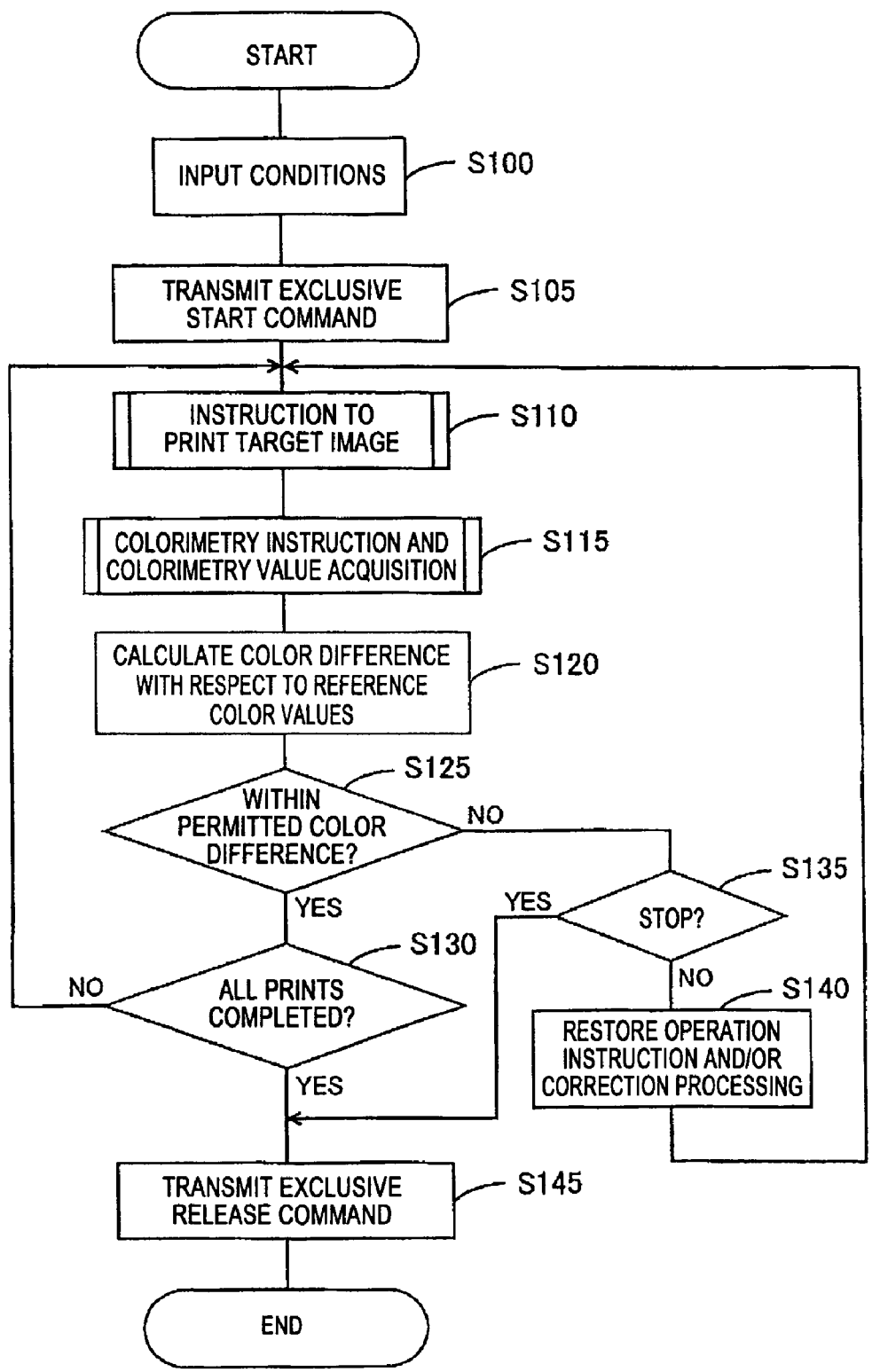
FIG. 4 is an example of a flowchart which shows the processing which is executed by an APL-based computer.

FIG. 4 shows processing content which the computer 10 executes on the basis of the APL 14a in the embodiment by means of a flowchart.

In step S ('step' will not appear hereinbelow) 100, the computer 10 first displays a setting screen (application screen) for performing printing and colorimetry for a target image which is selected by means of a user operation on the display 18a and various conditions are entered via the application screen.

Figure 5:
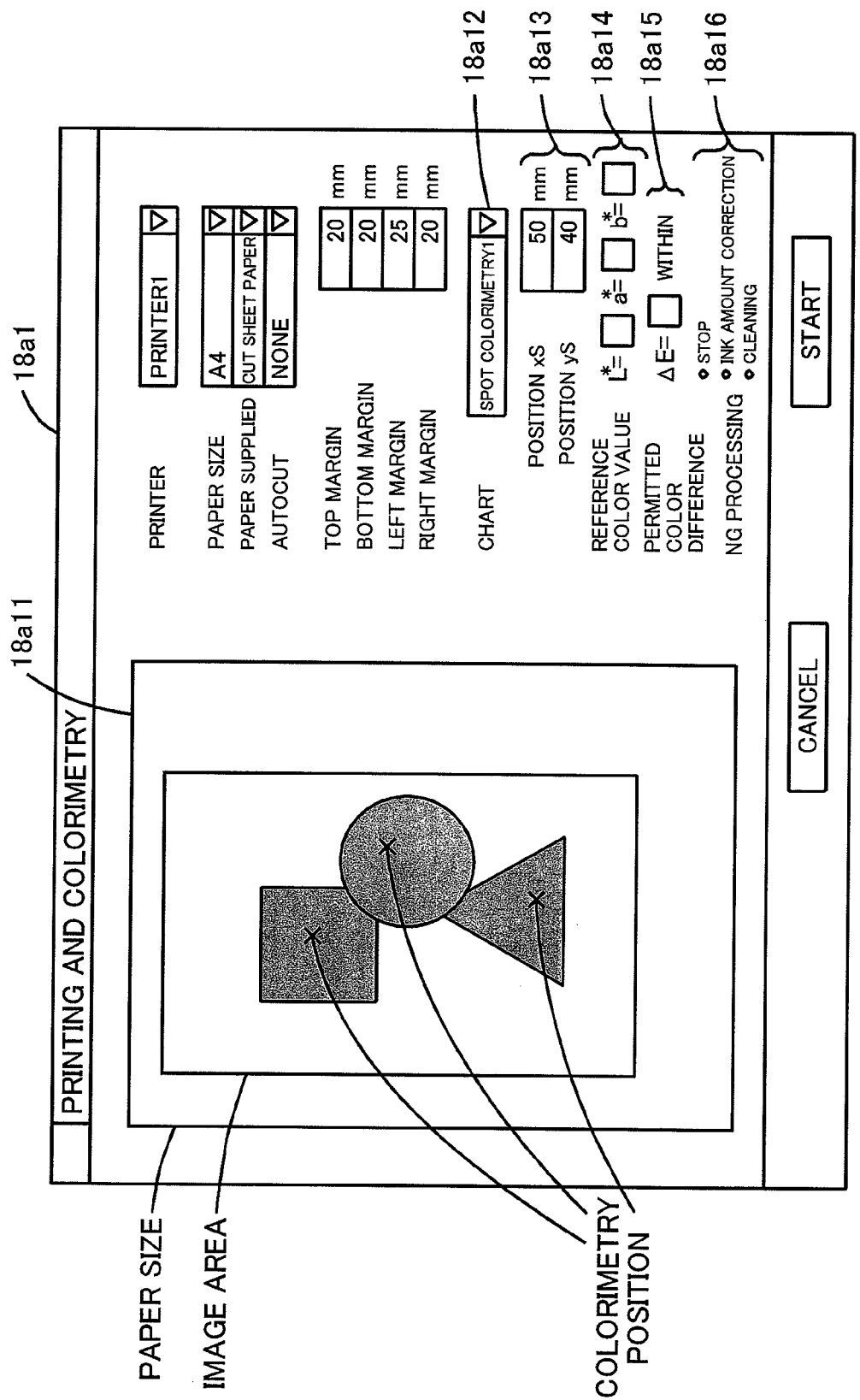
FIG. 5 shows an example of an application screen.

FIG. 5 shows an example of an application screen.

As shown in FIG. 5, in application screen 18a1, which is a user interface, a display is executed for selecting or setting the printer type being used (the printer 20 is selected in this embodiment), the paper size, the paper supply method, the autocutting (the cutting of the paper by the cutter 25a1) option, the respective margins at the top and bottom and left and right of the print paper, the type of chart of the colorimetry target, the position of the spot colorimetry, the reference color value (reference value) with respect to the result of the spot colorimetry, the permitting color difference for the permitted range of the shift between the result of the spot colorimetry and the reference color value, processing in cases where the result of a color evaluation is negative (NG), and so forth, and various conditions are acquired in accordance with the user input operation. Naturally, various conditions in addition to the above conditions, such as the number of prints, can also be entered and acquired.

In the input field 18a12 of application screen 18a1, one chart type for the colorimetry target is selected or the execution of spot colorimetry is selected. A chart refers to an image in which a plurality of color patches are collected. That is, the user selects one chart for printing and performing colorimetry from among various charts in which the number of patches and colors thereof are different or selects spot colorimetry rather than selecting a chart, via the input field 18a12. In FIG. 5, an example in which 'spot colorimetry 1' is selected via input field 18a12 is shown. In this embodiment, as will be described subsequently, position designation in the spot colorimetry of a plurality of points is possible, 'spot colorimetry 1' is selected via input field 18a12 when a first point is designated and 'spot colorimetry 2' and 'spot colorimetry 3' and so forth are selected in that order via input field 18a12 when the second and third points and so forth are designated. When spot colorimetry is selected via the application screen 18a1, input field 18a13 of the colorimetry position (xS, yS) of the spot colorimetry, input field 18a14 of reference color value (the respective values of L, a, and b in this embodiment), input field 18a15 of the permitted color difference ΔE, and input field 18a16 for selecting the processing of an NG case (interruption, cleaning, and in k amount correction and so forth) are validated. In cases where a chart is selected via the input field 18a12, display fields for displaying and inputting the number of patches constituting the selected chart, the length and width sizes of the patches, the number of lines of the patches, and the chart positions and so forth are validated but do not appear in FIG. 5.

Furthermore, the application screen 18a1 displays a preview display (thumbnail display) 18a11 which shows the range of the print paper and the target image disposed in this range on the basis of the paper size and the respective margins on the top, bottom, left and right edges which are entered, and the image data 14c which represent the target image saved in HD 14.

In this state, a colorimetry position is optionally designated as a result of the user operating a mouse 18c or the like to click on the desired position on the thumbnail display 18a11. Thereupon, the computer 10 converts the distance between the designated position which has two dimensional coordinates which the computer 10 is capable of grasping and the starting point of the print paper (paper starting point) into the actual distance (mm) and automatically displays the distance which has been converted in input field 18a13. The computer 10 recognizes the paper size, the respective margins at the top, bottom, left and right edges of the paper, and the colorimetry position within the target image. Hence, the distance in the horizontal direction (main scanning direction) and vertical direction (paper feed direction) between the paper starting point and the colorimetry position can be calculated and the distance in the horizontal direction thus calculated is displayed in the input field 18a13 as xS and the distance in the vertical direction thus calculated is displayed in the input field 18a13 as yS. In this embodiment, the paper starting point is the top left edge of the print paper.

Thus, the work of designating the colorimetry position is very easy because the user is able to visually designate the colorimetry position while viewing the thumbnail display 18a11.

The number of colorimetry positions which the computer 10 receives via the thumbnail display 18a11 is arbitrary. In FIG. 5, only an input field 18a13 which corresponds with a colorimetry position at a single point is shown. However, if colorimetry positions are designated at n (where n is an integer of 2 or more) points, the computer 10 may display colorimetry positions at n points. Furthermore, in cases where the user designates colorimetry positions at a plurality of points, the user sets reference color values which correspond with the respective colorimetry positions. The computer 10 may execute a screen display which permits a plurality of input settings for the reference color values. The user may directly input the desired colorimetry position (xS, yS) in the input field 18a13. Thus, the APL 14a is able to receive a designation of the colorimetry position on the target image via the application screen 18a1 and, in that sense, it may be said that the APL 14a implements a reception section in collaboration with the computer 10. The selection of the permitted color difference ΔE and NG case processing may also employ default settings which the APL 14a possesses beforehand as is. The reference color values can also be acquired by a variety of methods other than inputting by the user (a specific example will be described subsequently).

2-2. Print Processing/Application Side

Please return to the flowchart of FIG. 4.

In S105, the computer 10 transmits an exclusive start command to the printer 20. The exclusive start command is one type of exclusive command and is a command which announces that the APL 14a is to commence exclusivity to the printer 20 in order to execute a series of jobs (JOB). More details will be provided hereinbelow. However, following receipt of the exclusive start command, the printer 20 executes only processing which is based on the instructions of the APL 14a (including instructions of the PRTDRV 14b) unless an exclusivity cancellation command (an exclusive release command) is received.

In S110, the computer 10 instructs the printer 20 to perform printing based on the image data 14c which represent the target image.

Figure 6:
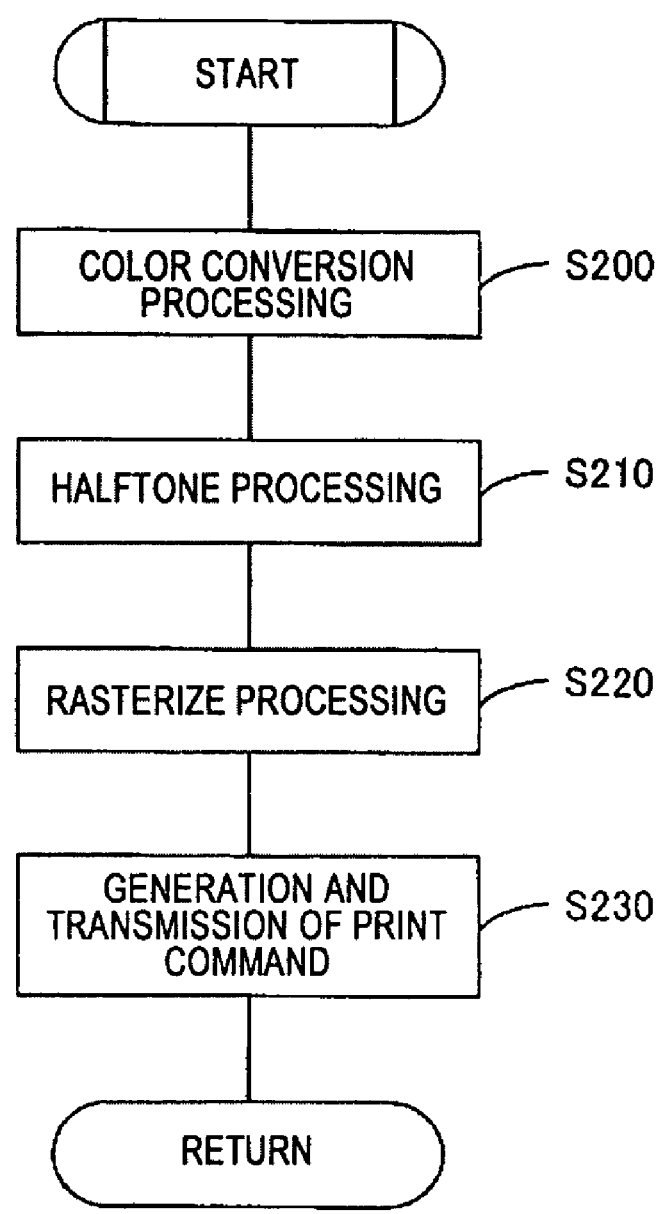
FIG. 6 is an example of a flowchart which shows the details of a print instruction.

FIG. 6 shows the details of the processing of S110. This processing is executed by the PRTDRV 14b. That is, the APL 14a reads the image data 14c from the HD 14 and starts up the PRTDRV 14b before handing over the image data 14c to the PRTDRV 14b.

In S200, the PRTDRV 14b executes the color conversion processing with the image data 14c serving as the target and converts the image data 14c into image data (ink data) represented by the grayscale values of each ink type (C, M, Y, K, Lc, and Lm in the case of this embodiment) used by the printer 20, for each pixel. In this embodiment, the image data 14c are data of the sRGB color system according to which each dot-matrix-shaped pixel is represented by grayscale values for each of R, G, and B (red, green, and blue) and the PRTDRV 14b references a color conversion lookup table (LUT) which is pre-recorded on the HD 14 and converts the RGB data into ink data for each pixel. The color conversion LUT is a table which represents colors by means of RGB data and ink data and associates both data and which describes the relationships between a plurality of colors. The image data 14c may undergo color conversion processing by using the color conversion LUT prescribing the relationships between the CMY data and ink data in cases where the image data 14c are data which represent the respective pixels by means of grayscale values for each CMY.

In S210, the PRTDRV 14b executes halftone processing with the color-converted image data serving as the target. In halftone processing, commonly known methods such as the dither method or error diffusion method is used to generate halftone data which prescribe the discharge/non-discharge of dots for each pixel and each ink type. In S220, the PRTDRV 14b executes predetermined rasterize processing on the halftone data to arrange the halftone data in the order in which the printer 20 prints the data and generates raster data (image data) for each ink type.

In S230, the PRTDRV 14b generates a print command and transmits same to the printer 20 via the printer I/F 17c. The print command is a command which is transmitted so that the computer 10 makes the printer 20 execute print processing and, more precisely, signifies a print area definition command, a print position update command, and a print data command. The print area definition command is a command which includes information on the paper size and margin acquired in S100 and is a command which serves to indicate the image area of the target image within the print paper to the printer 20. The print position update command is a command which indicates the printing start position for each single scan by the print head 25*a*. The print data command is a command which indicates the actual dot discharge processing which accompanies the conveyance of the print paper and the movement of the print head 25*a* and includes raster data for each ink type in a quantity that corresponds to a single scan by the print head 25*a*.

After the print command has been transmitted to the printer 20 in S110, the computer 10 issues a colorimetry instruction to the printer 20 in S115. However, before the colorimetry is described, the processing by the printer 20 with respect to the print command will be described first.

2-3. Print Processing/Printer Side

Figure 7:
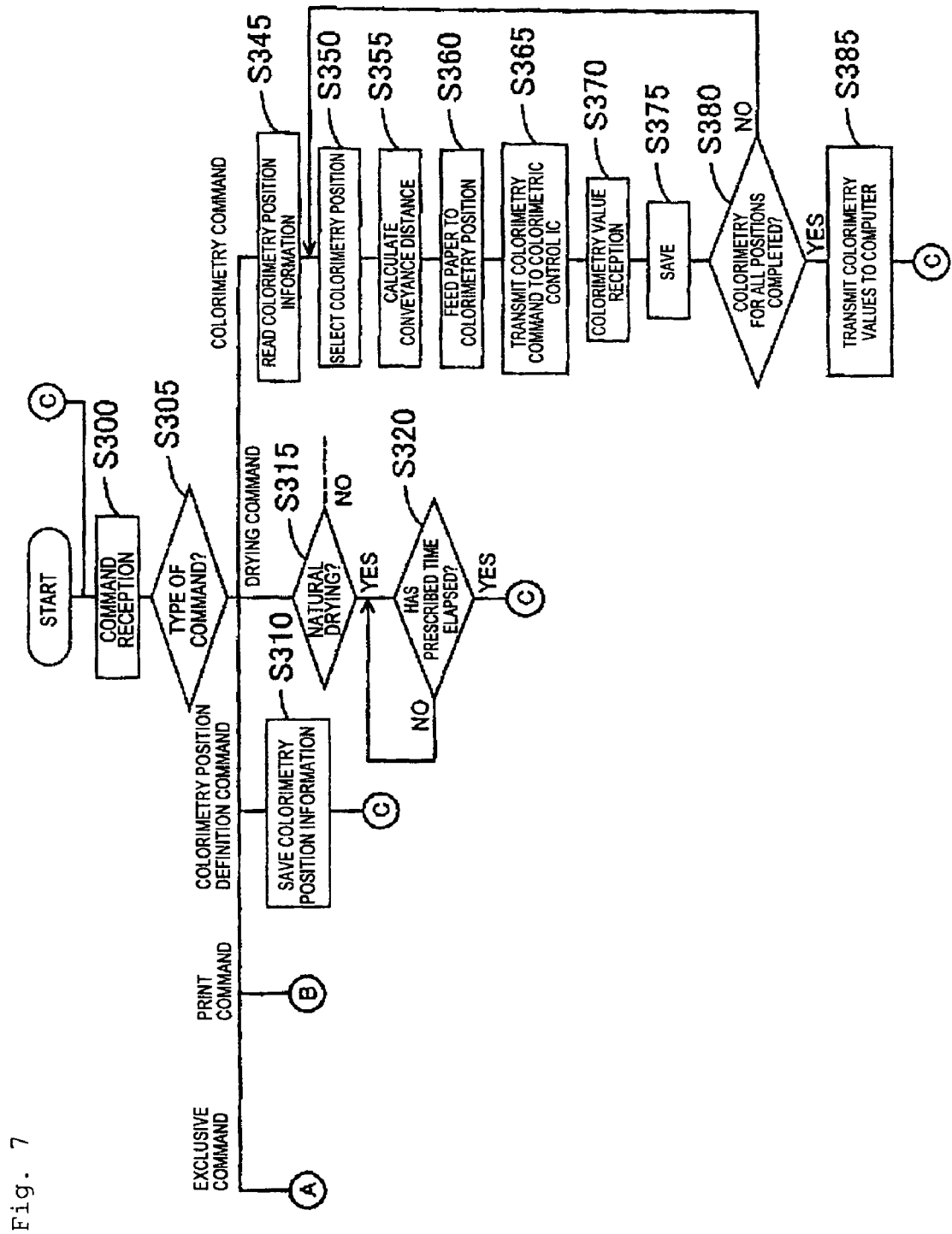
FIG. 7 is an example of a flowchart which shows part of the processing executed by a printer control IC.

FIG. 7 shows part of the processing which the printer control IC25 of the printer 20 executes on the basis of the printer controller 250 in this embodiment.

The commands which are transmitted by the computer 10 to the printer 20 are input to the printer 20 via the communication I/F 24 and are all input to the printer control IC 25, thereby becoming the target of processing by the printer controller 250.

Upon receipt of a command from the computer 10 (S300), the printer control IC 25 distinguishes in S305 whether the received command is an exclusive command, a print command, a colorimetry position definition command, a drying command, or a colorimetry command and divides up the subsequent processing according to the type of command thus distinguished.

Figure 8:
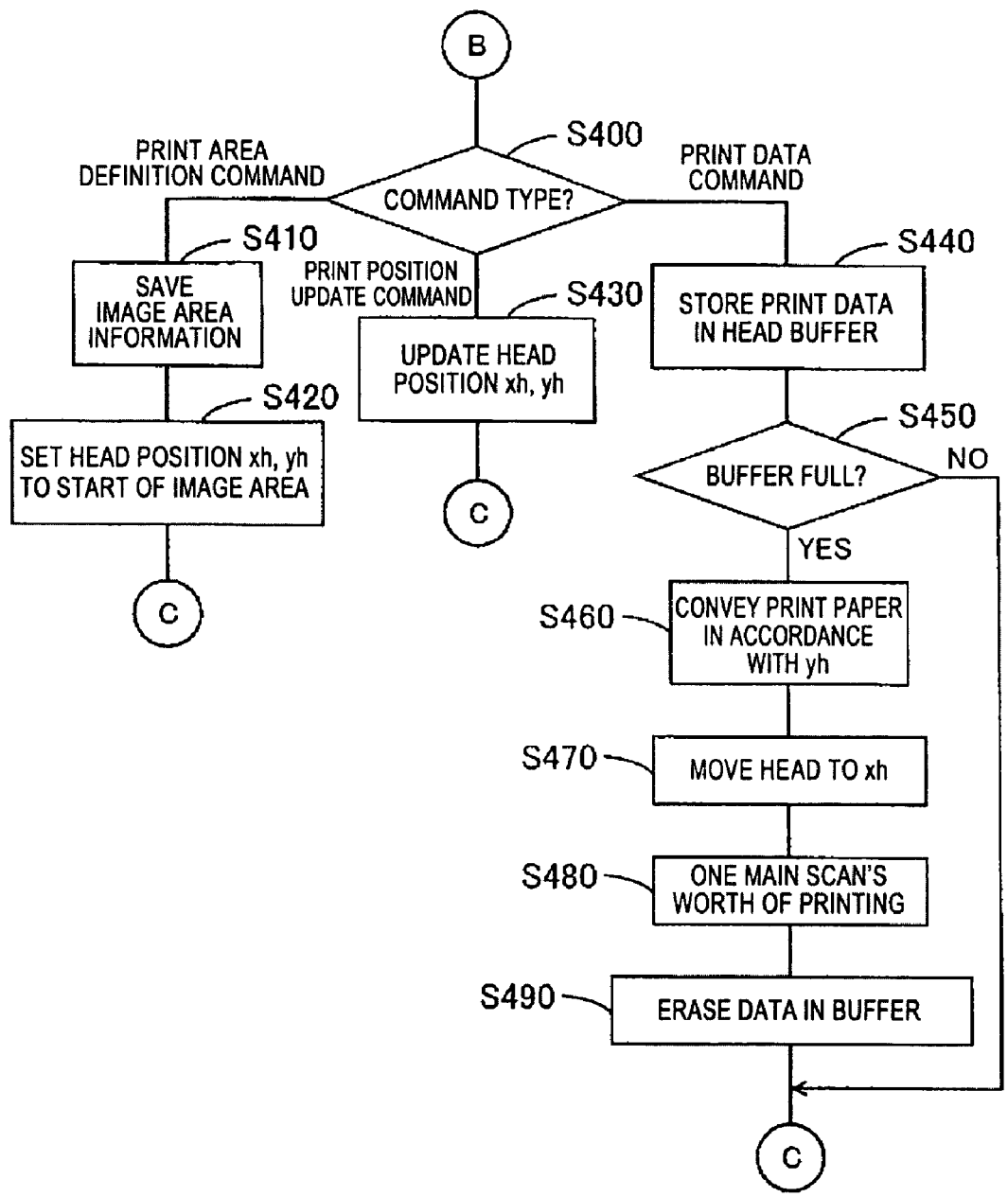
FIG. 8 is an example of a flowchart which shows part of the processing executed by a printer control IC.
Figure 9:
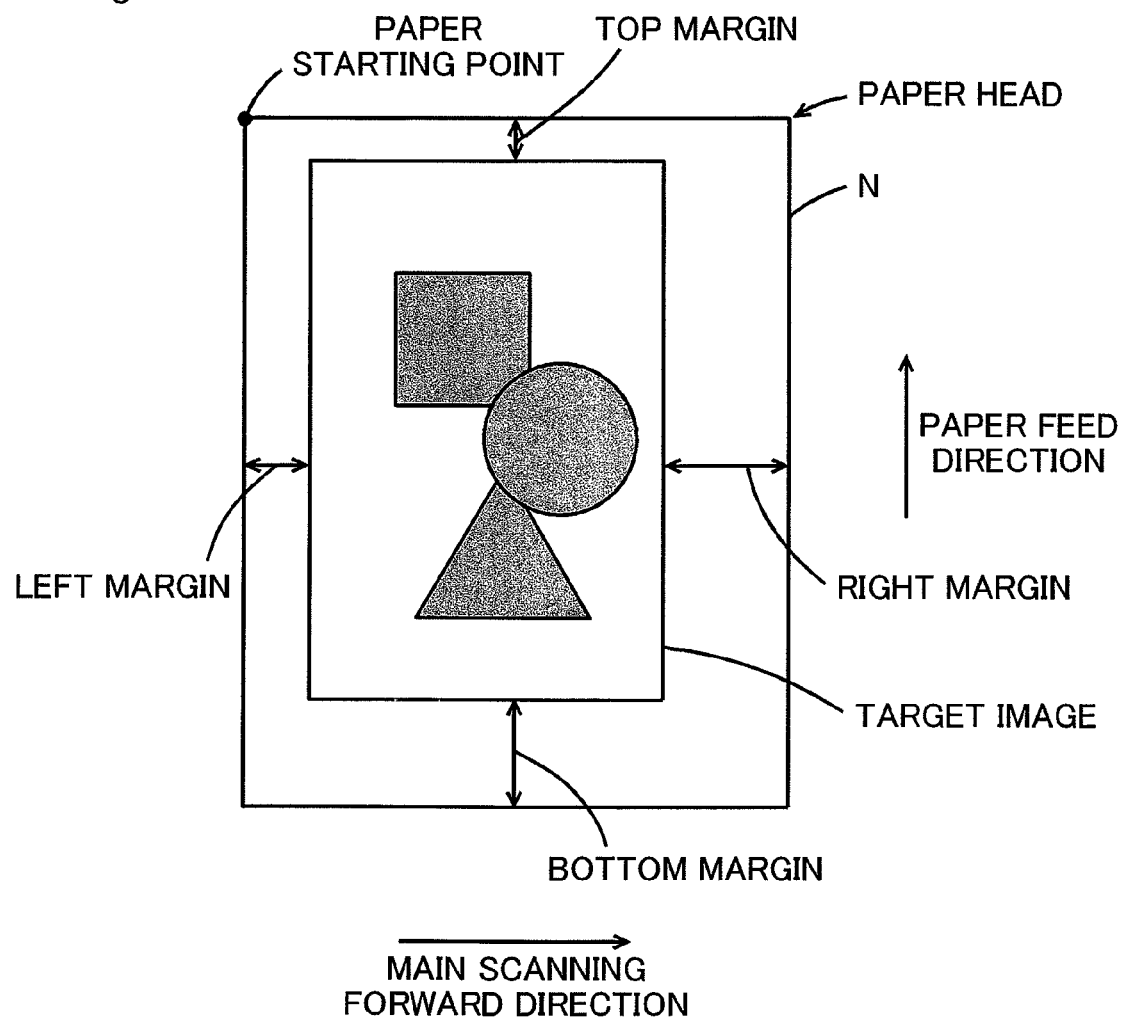
FIG. 9 is an example which shows an image that has been printed in accordance with a print command.

FIG. 8 represents processing which the printer control IC 25 executes on the basis of the printer controller 250 in cases where a print command is received and FIG. 9 represents the target image which the printer 20 prints on the print paper N in accordance with the flowchart of FIG. 8.

In S400, it is distinguished whether the print command is a print area definition command, a print position update command, or a print data command and the subsequent processing is divided up in accordance with the type of print command thus distinguished. In cases where a print area definition command is received, the printer control IC 25 saves the image area information contained in the command in a predetermined storage area in S410. Image area information is information which indicates the paper size and the respective margins on the top, bottom, left and right edges which were acquired in S100 above.

In S420, the values for the position of the print head 25*a* (xh, yh) are set as the values for the start position of the image area on the print paper N (the image start position during a first main scan). The print head position (xh, yh) is a position on the paper for which the paper starting point of the print paper N serves as a reference, where the value of xh signifies the distance in the main scanning forward direction (X direction) from the paper starting point and the value of yh signifies the distance in the direction opposite the paper feed direction (Y direction) from the paper starting point. The start position of the image area of the target image can be specified by means of the image area information. That is, the start position of the image area is specified by means of the left margin (20 mm, for example) and the top margin (20 mm, for example) among the respective margins of the top, bottom, left, and right edges, and, therefore, settings are made in S420 such that xh=the value of the left edge margin and yh=the value of the top edge margin.

In cases where a print position update command is received, the printer control IC 25 indicates a print position update command in S430. The set values for the print head position (xh, yh) are updated according to the image start position (x, y) for the next main scan.

In cases where a print data command is received, the printer control IC 25 stores the print data in the buffer of the print head 25*a* in S440. The print data include raster data for each ink type in a quantity which corresponds to one main scan and the buffer has a capacity capable of storing print data in a quantity which corresponds to a single main scan. A judgment with regard to whether data have been stored in the buffer to full capacity is made in S450. In cases where such a judgment is made, the printer control IC 25 executes conveyance of the print paper N and movement of the print head 25*a* in steps S460 and S470 in accordance with the print head position (xh, yh) which has been set at that point in time. That is, the printer control IC 25 sends an instruction to the paper feed mechanism 25*d* and feeds the print paper N so that there is a match between position yh and the scanning position of the print head 25*a* and sends an instruction to the carriage mechanism 25*c* to move the carriage along the guide rail so that the print head 25*a* matches position xh.

In S480, the printer control IC 25 executes printing in a quantity which corresponds to one main scan. That is, the printer control IC 25 executes movement of the carriage at a predetermined speed, the transfer of raster data from the buffer to the head drive section 25*b* and the output of an application voltage pattern from the head drive section 25*b* to the print head 25*a* in accordance with this raster data transfer, and the discharge of dots by the print head 25*a*. When printing in a quantity corresponding to one main scan is terminated, the data in the buffer are deleted in S490.

The printer 20 is able to print a target image of the kind shown in FIG. 9 by receiving a print area definition command and a plurality of print position update commands and print data commands which are required for printing the target image in a predetermined order from the computer 10. Further, in this sense, it may be said that the computer 10 and printer 20 comprise a print control section.

2-4. Colorimetry Processing/Application Side

The description will be continued by returning to FIG. 4.

In S115, the computer 10 issues a target image colorimetry instruction to the printer 20 and the computer 10 acquires the target image colorimetry value resulting from colorimetry by the printer 20 in accordance with the colorimetry instruction. A colorimetry instruction basically refers to processing to generate and transmit a colorimetry position definition command, a dryer command, and a colorimetry command.

Figure 10:
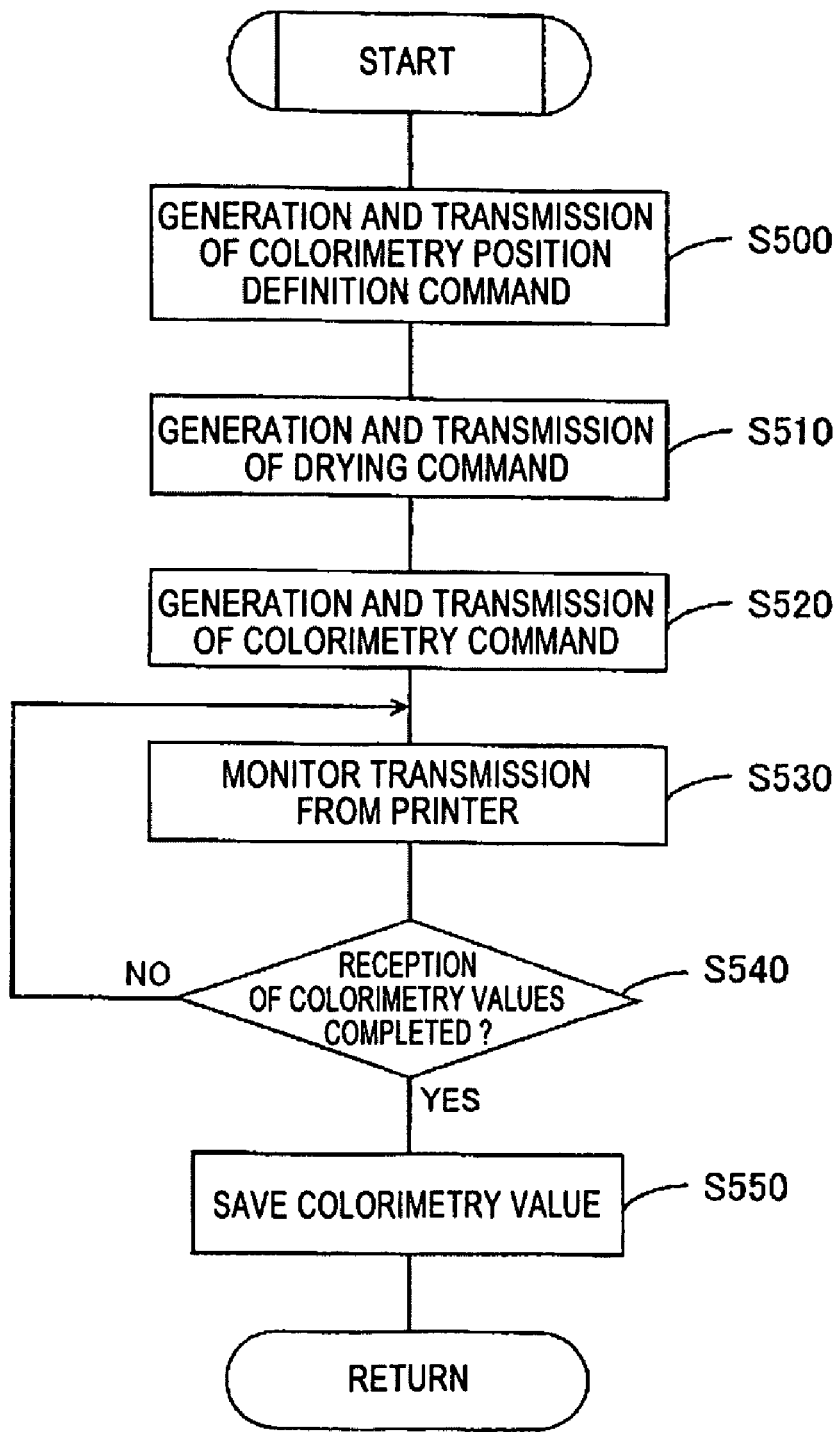
FIG. 10 is an example of a flowchart which shows the details of processing to acquire a colorimetry instruction and colorimetry value.

FIG. 10 shows the details of S115 by means of a flowchart.

In S500, the computer 10 generates a colorimetry position definition command for the purpose of indicating a colorimetry position on the print paper and transmits this colorimetry position definition command to the printer 20 via the printer I/F 17*c*. Naturally, the color measurement position on the print paper is a colorimetry position (xS, yS) which is received via the application screen 18*a*1. In cases where colorimetry positions are designated at a plurality of points, a colorimetry position definition command which contains information on the plurality of colorimetry positions is generated.

In S510, the computer 10 generates a drying command which is transmitted to the printer 20 via the printer I/F 17*c*. The computer 10 generates either a natural drying command or a forced drying command as the drying command. A natural drying command designates the fact that a printed image is to be allowed to dry naturally without further processing for a predetermined time and comprises information which prescribes the time for the natural drying. However, a forced drying command indicates that the printed print paper is to be conveyed to the position of installation of dryer 26*d* and that a predetermined position of the printed image is to be forcibly dried by means of the dryer 26*d*. The computer 10 elects to generate a natural or forced drying command and makes drying time settings by using settings that have been made beforehand depending on the type of the print paper and on whether settings for the type of chart used by the APL 14*a* and settings for spot colorimetry have been made or based on a user entry operation.

In S520, the computer 10 generates a colorimetry command and transmits this command to the printer 20 via the printer I/F 17*c*. The colorimetry command instructs the printer 20 to convey the print paper so that the colorimetry position designated for the print paper is below the movement path of the colorimetry section 26*a* and to perform colorimetry using the colorimetry section 26*a* on the colors in the colorimetry position. The colorimetry command contains information which designates various conditions according to which the colorimetry section 26*a* is to execute the colorimetry such as, for example, the output format of the colorimetry result (Lab/xyz/spectral, or the like), the color on the oblique surface 29*a* side located opposite the colorimetry section 26*a* with the print paper interposed therebetween (called the background color and basically black or white), and the field of view of the color detection section 26*a*1 (two degrees or 10 degrees). The computer 10 makes these colorimetry condition settings by using values which have been preset for the APL 14*a* or based on a user entry operation. The respective commands are generated separately in the processing of FIG. 10 and need not be transmitted. A drying command and colorimetry command may also be generated and transmitted collectively as a single command.

In S530, the computer 10 monitors the transmission of the colorimetry values from the printer 20. That is, following the transmission of the colorimetry command, the computer 10 awaits the transmission of the colorimetry values for the colorimetry position of this designation from the printer 20.

In S540, the computer 10 judges whether colorimetry values relating to all of the designated colorimetry positions on the target image have been received and, in cases where it is judged that the receipt of all the colorimetry values is completed, saves the colorimetry values received in S550 in the HD 14.

Following the receipt of the colorimetry values from the printer 20 in S115, the computer 10 is able to perform evaluation processing which is based on the colorimetry results in S120 and subsequent steps. However, prior to the description of S120 and subsequent steps, the processing by the printer 20 of the colorimetry position definition command, drying command, and colorimetry command will be described first.

2-5. Colorimetry Processing/Printer Side

When described once again using FIG. 7, in cases where a colorimetry position definition command is received, the printer control IC 25 extracts information on the colorimetry position (xS, yS) from the colorimetry position definition command in S310 via S300 and S305 and saved the extracted information in a predetermined storage area.

A case where a drying command is received will be described next. The dryer 26 of this embodiment is suited to a case where a range which is to a certain extent narrow (a chart consisting of about two patch rows, or the like, for example) is dried all at once but is not well suited to drying an image which has been printed over a wide range of the print paper. Accordingly, in this embodiment which involves printing a target image and performing spot colorimetry on the target image, the computer 10 basically generates and transmits a natural drying command as a drying command. In the case in which the drying command is received, the printer control IC 25 judges whether the drying command is a natural drying command in S315 after passing through S300 and S305. Because the drying command is a natural drying command in this embodiment, the printer control IC 25 judges whether the time for the natural drying prescribed by the natural drying command has elapsed after the completion of the printing of the target image (S320) and waits until this time has elapsed when the time has not elapsed. However, in cases where the prescribed time has elapsed, the processing moves to processing which corresponds with the command that is received after the drying command.

In cases where a colorimetry command is received, the printer control IC 25 reads the colorimetry position (xS, yS) saved in the predetermined storage area via S300 and S305 (S345). Thereafter, in S350, one colorimetry position (xS, yS) which is to constitute the colorimetry target is selected. If the colorimetry position received via the thumbnail display 18*a*11 is a single point, there is no scope for a selection (only the colorimetry position of this single point is selected). However, in cases where a plurality of points are received, one of these points must be selected. In this embodiment, the colorimetry positions (xS, yS) thus read are selected in order starting with the colorimetry position with the smallest yS value. That is, colorimetry is performed in order starting from a position close to the head of the print paper.

In S355, the printer control IC 25 calculates the conveyance distance D1 of the print paper required in order to allow the colorimetry section 26*a* to perform colorimetry on the colorimetry position selected in S350 (xS, yS).

Figure 11:
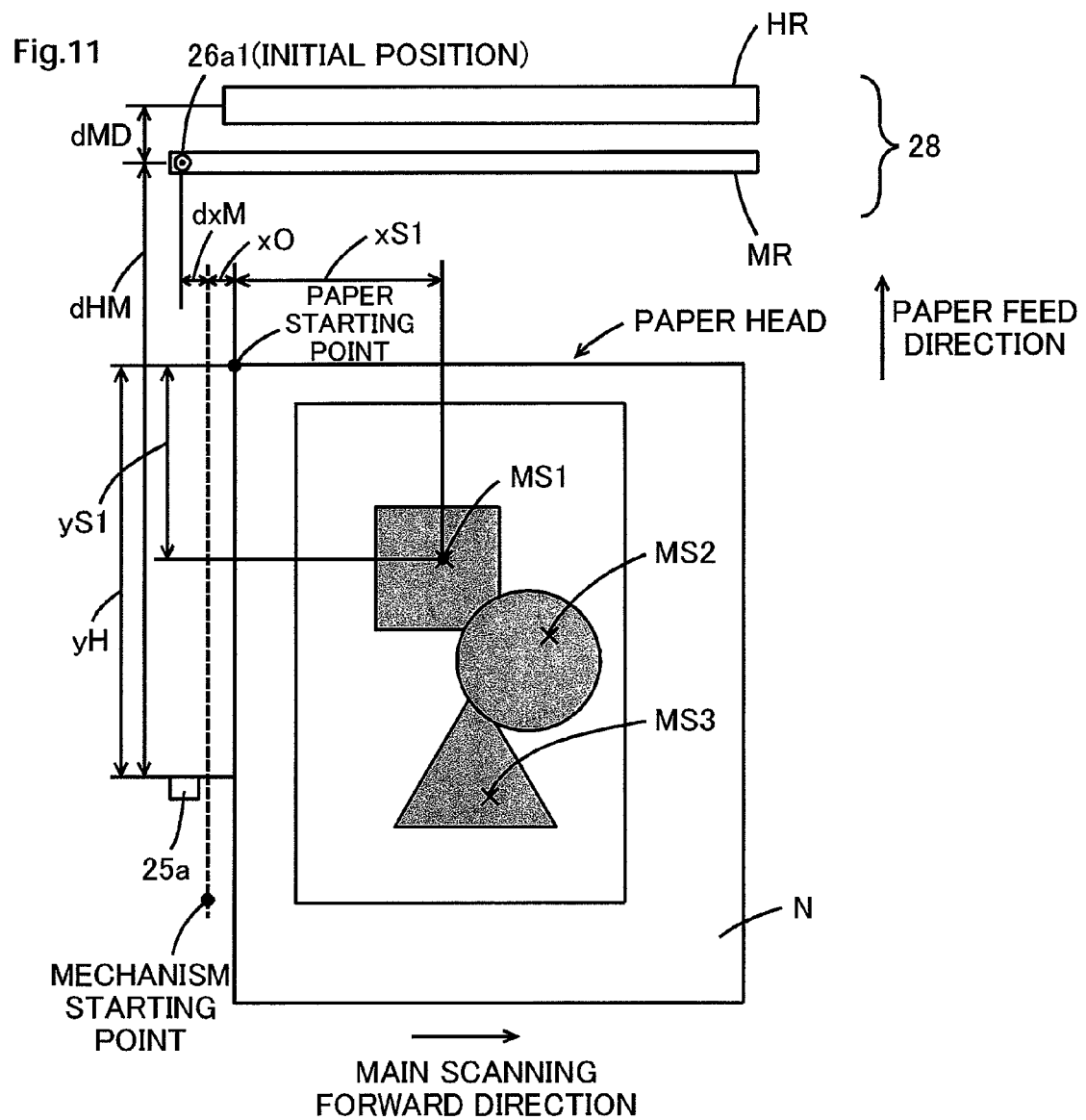
FIG. 11 is an example of a view to illustrate the conveyance distance of the print paper and the movement distance of the colorimetry section.

FIG. 11 shows the positional relationship between the print paper N which has been printed with the target image and the colorimetry drying unit 28 or the like. In FIG. 11, the calorimetric drying unit 28 is displayed divided into a drying range HR and a colorimetry range MR. The drying range HR is a range which can be dried at once by the dryer 26*d* and the colorimetry range MR is a range which can be subjected to colorimetry when the colorimetry section 26*a* is moved in the main scanning direction. Furthermore, in FIG. 11, the designated colorimetry positions (MS1 (xS1, yS1), MS2 (xS2, yS2), MS3 (xS3, yS3)) are shown separately on the target image.

The printer control IC 25 calculates the conveyance distance D1 for the very first colorimetry position selected in S350 (the colorimetry position MS1 which is closest to the head of the paper) by means of Equation (1).

$$D1 = dHM - (yH - yS) \tag{1}$$

dHM is the distance between the print head 25*a* in the paper feed direction and the color detection section 26*a*1 of the colorimetry section 26*a*. dHM is a fixed value which is dependent on the product design of the printer 20 and the printer 20 possesses the dHM beforehand as data in a predetermined storage area.

yH is the distance from the print head 25*a* to the paper starting point (paper head) in the paper feeding direction at the current point in time. The printer control IC 25 is able to calculate the distance over which the print paper N is conveyed by the paper feed mechanism 25*d* based on the number of rotations of the paper feed roller. Hence, in the process of printing the target image, the distance over which the print paper N is fed to the paper feed mechanism 25d is calculated and the distance yH from the print head 25a to the paper head after the target image is printed is specified based on the distance thus calculated. yH is one type of medium position information.

yS is yS1 above.

In S360, the printer control IC 25 feeds the print paper N in the paper feed direction to an extent equal to the conveyance distance D1 calculated above. That is, the printer control IC 25 executes paper feeding to an extent which corresponds with the conveyance distance D1 by issuing an instruction to the paper feed mechanism 25d. As a result of this conveyance processing, the print paper N comes to be located under the calorimetric drying unit 28 in a state where the colorimetry position MS1 and the position of the color detection section 26a1 of the colorimetry section 26a match in the paper feed direction.

In S365, the printer control IC 25 transmits a colorimetry command to the calorimetric control IC 26. In this case, the printer control IC 25 transmits a colorimetry command together with information on the colorimetry position (xS, yS) selected in the most recent S350. As a result, processing which corresponds with the colorimetry command can be performed by the calorimetric control IC 26.

In S370, the printer control IC 25 receives a colorimetry value transmitted by the calorimetric control IC 26 and saves the colorimetry value received in S375 in a predetermined storage area.

In S380, it is judged whether the saving of the colorimetry values for all of the colorimetry positions (xS, yS) has been completed and, when there is an unprocessed colorimetry position, the processing returns to S350, whereupon the colorimetry position with the smallest yS value among the unprocessed colorimetry positions is newly selected and the processing to S375 is repeated. The conveyance distance D1 for the colorimetry position (xS, yS) of the second and subsequent points is the difference in the paper feed direction from the nearest colorimetry position subjected to colorimetry. For example, the conveyance distance D1 required in order to perform colorimetry on the colorimetry position MS2 is D1=yS2−yS1.

However, in cases where the saving of the colorimetry values is completed for all of the colorimetry positions, the printer control IC 25 transmits the colorimetry values for all of the colorimetry positions to the computer 10 via the communication I/F 24 (S385).

Figure 12:
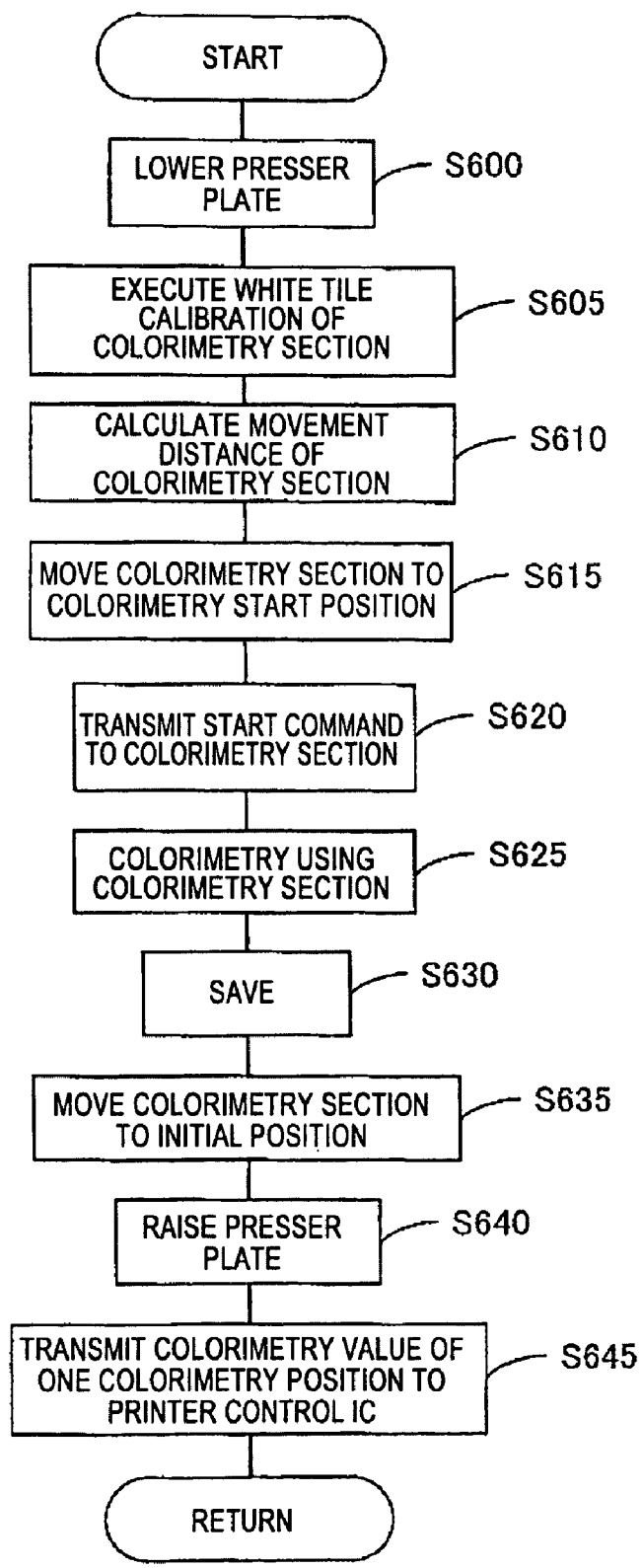
FIG. 12 is an example of a flowchart which shows the processing that is executed by a calorimetric control IC.

FIG. 12 shows the processing executed by the calorimetric control IC 26 in accordance with the colorimetry command transmitted by the printer control IC 25 by means of a flowchart.

In S600, the calorimetric control IC 26 issues an instruction to the presser plate drive mechanism 26c to lower the presser plate, thereby pressing the print paper N below the calorimetric drying unit 28.

In S605, the calorimetric control IC 26 executes calibration of the colorimetry section 26a. In this embodiment, a white tile which constitutes a completely white plate is installed in a position facing the color detection section 26a1 of the colorimetry section 26a which waits in the initial position and, when the colorimetry processing is started, the white tile is first subjected to colorimetry by the colorimetry section 26a. The colorimetry section 26a compares the result of subjecting the white tile to colorimetry with a colorimetry result reference value for the white tile which is pre-provided as data and thus acquires the difference between the result and the reference value. The colorimetry section 26a generates a correction value for the colorimetry result on the basis of the difference. Thereafter, after correcting the colorimetry value acquired through colorimetry using the correction value, the colorimetry section 26a outputs the corrected colorimetry value to the calorimetric control IC 26.

In S610, the calorimetric control IC 26 calculates the movement distance of the colorimetry section 26a on the basis of information on the colorimetry position. The movement distance as it is intended here signifies a movement distance D2 from the initial position of the colorimetry section 26a to the colorimetry position constituting the colorimetry target at this time. The movement distance D2 is calculated by Equation (2).

$$D2 = xS + x0 - dxM \qquad (2)$$

x0 represents the distance in the main scanning direction from the starting point of the mechanism of the printer 20 to the paper starting point, as shown in FIG. 11. The printer 20 predetermines a specified position of the device body as the mechanism starting point. The printer 20 detects the paper starting point by means of a predetermined sensor when the print paper N is placed in the printer 20, for example, calculates the distance x0 in the main scanning direction from the mechanism starting point to the paper starting point, and saves the distance x0 as data in a predetermined storage region. The distance x0 is one type of medium position information.

dxM represents the distance from the mechanism starting point to the initial position of the colorimetry section 26a (color detection section 26a1) in a case where the main scanning forward direction is taken as positive. The pickup position of the calorimetric drying unit 28 is determined based on the design of the printer 20 and the distance between the mechanism starting point and the initial position of the colorimetry section 26a is therefore also a fixed value. The printer 20 has dxM which is a fixed value as data. In the example in FIG. 11, the initial position of the color detection section 26a1 is in a more negative position than the mechanism starting point and therefore dxM is a negative value. xS is the value xS for the colorimetry position which is transmitted together with a colorimetry command by the printer control IC 25 in S365. Each of the above equations which are used in this embodiment may also employ another equation if the point signified by the calculation result is the same.

Thus, at the point where the conveyance distance of the print paper N and movement distance of the colorimetry section 26a is calculated on the basis of the colorimetry position (xS, yS) designated on the target image, the printer 20 can be said to comprise a determination section within the scope of the claims.

In S615, the calorimetric control IC 26 issues an instruction to the colorimetry section movement mechanism 26b so that the colorimetry section 26a is moved in the main scanning forward direction from an initial position in an amount equal to the movement distance D2.

In S620, the calorimetric control IC 26 transmits a start command to instruct the colorimetry section 26a to start the colorimetry and the colorimetry section 26a is caused to start the colorimetry in one colorimetry position. The start command contains various conditions for the colorimetry designated by the colorimetry command (conditions for the output format (Lab) of the colorimetry result, the background color of the print paper, and the field of view of the color detection section 26a1, and so forth) and these various conditions are also instructions for the colorimetry section 26a. In S625, the colorimetry section 26a performs a colorimetry operation in the position following the movement and acquires colorimetry values.

In S630, the calorimetric control IC 26 outputs the colorimetry values to the colorimetry section 26a and saves the colorimetry values thus output in a predetermined recording area.

In S635, the calorimetric control IC 26 issues an instruction to the colorimetry section movement mechanism 26b and moves the colorimetry section 26a to an initial position. In S640, the calorimetric control IC 26 issues an instruction to the presser plate drive mechanism 26c to raise the presser plate. Further, in S645, the calorimetric control IC 26 transmits the colorimetry value of the one saved colorimetry position to the printer control IC 25. As mentioned earlier, the printer control IC 25 receives the colorimetry values transmitted by the calorimetric control IC 26 in S370. As mentioned earlier, the print paper N is conveyed on the basis of the conveyance distance D1 and the colorimetry section 26a is moved on the basis of the movement distance D2 and, at the point where colorimetry is executed by the colorimetry section 26a, the printer 20 may be said to comprise a conveyance section and a calorimetric control section.

Thus, once the computer 10 acquires the colorimetry values for the colorimetry position on the target image optionally designated by the user via the application screen 18a1, the processing moves to S120 (See FIG. 4).

2-6. Color Evaluation Processing

In S120, the computer 10 calculates the color difference $\Delta E$ between the colorimetry values acquired from the printer 20 in S115 above and the reference color values (Lab values) which were set in S100. Naturally, in cases where colorimetry positions at a plurality of points have been designated, the computer 10 compares the reference color values with the colorimetry values for each colorimetry position and calculates the color difference $\Delta E$. Any of the respective CIE1976, CIE1994, and CIE2000 color difference formulae may be employed in the calculation of the color difference $\Delta E$.

In S125, the computer 10 judges whether the color difference $\Delta E$ thus calculated is equal to or less than the permitted color difference $\Delta E$ set in S100 above. In cases where the color difference $\Delta E$ thus calculated is equal to or less than the permitted color difference $\Delta E$, the computer 10 judges that the colors of the printing result corresponding with the colorimetry position thus designated are normal and the processing moves on to S130. In cases where the permitted color difference $\Delta E$ is exceeded, the computer 10 judges that the colors of the printing result corresponding with the designated colorimetry position are anomalous and moves to S135. In cases where the color difference $\Delta E$ is calculated for each of the colorimetry positions of a plurality of points, when all of the color differences $\Delta E$ are equal to or less than the permitted color difference $\Delta E$, the processing moves to S130. At the point where the processing of S120 and S125 can be executed, the computer 10 is said to comprise a judgment section within the scope of the claims as one function.

In S135, the computer 10 judges whether 'stop' has been selected as processing for an NG case (See FIG. 5) in S100 above and, in cases where 'stop' has indeed been selected, the processing moves to S145 and the processing of FIG. 4 is terminated after transmitting an exclusive release command to the printer 20. However, in cases where an option other than 'stop' is selected, the computer 10 executes processing to eliminate any shift from the design ideals for the color reproduction characteristic of the printer 20 in accordance with this selection (S140). More specifically, in cases where 'cleaning' is selected, an instruction to perform processing to clean the nozzle of the print head 25a (an example of a print head recovery operation) is issued to the printer 20 and executed. Furthermore, in cases where 'ink amount correction' is selected, the computer 10 compares the ink amount which is ultimately discharged by the print head 25a with the current state on the basis of the image data and performs correction processing to change the ink amount on the basis of the color difference $\Delta E$ thus calculated. This correction can be implemented by revising the output grayscale values (the grayscale values of the ink data) prescribed by the color conversion LUT which is used by the PRTDRV 14b in accordance with the calculated color difference $\Delta E$, for example. In S100, both 'cleaning' and 'ink amount correction' may be selectable. Naturally, the processing in which the shift from the design ideal of the color reproduction characteristic of the printer 20 is not limited to the processing above.

Furthermore, in cases where a 'No' judgment is made in S125, the computer 10 may urge the user to perform the required maintenance on the printer 20 by issuing a predetermined warning display or the like to the display 18a and the colorimetry position in which the color difference $\Delta E$ between the colorimetry value and reference color value exceeds the permitted color difference $\Delta E$ may be specified on the thumbnail display 18a11.

Following S140, the computer 10 once again repeats the processing of S110 and subsequent steps.

In S130, the computer 10 judges whether the number of copies for which the colors of the colorimetry position are judged to be normal has reached a predetermined number of print copies that is set beforehand and, in cases where the predetermined number of copies has been reached, the computer 10 moves to S145, transmits an exclusive release command to the printer 20 and ends the processing. However, in cases where the predetermined number of copies has not been reached, the processing of S120 and subsequent steps is repeated. That is, in cases where the colors are not judged to be normal and reprinting takes place via S140, the printing result that has not been judged to be normal is removed from the copy count.

2-7. Printer Exclusivity

The exclusivity of the printer 20 for the computer 10 using the exclusive command will be described next.

Figure 13:
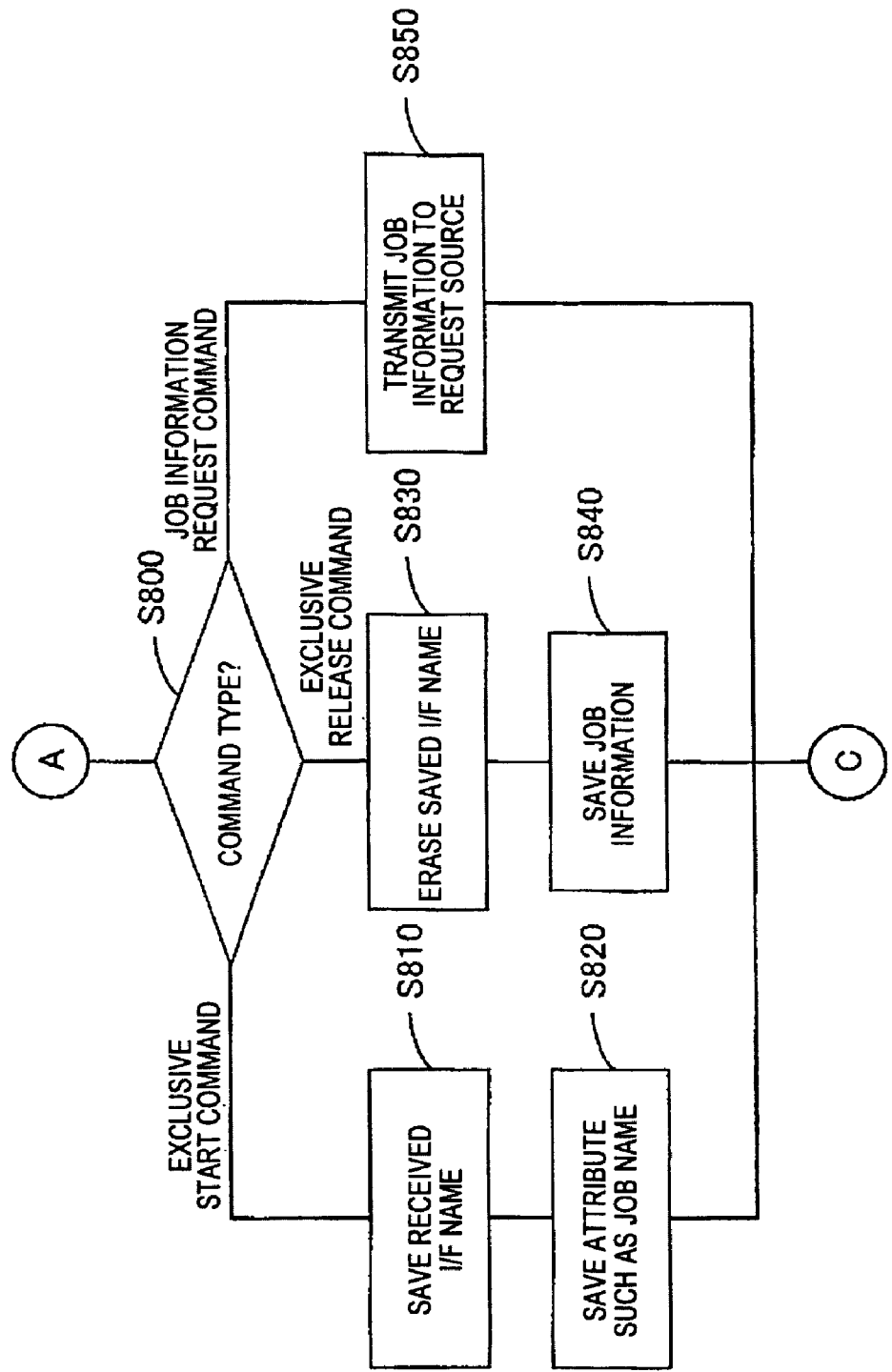
FIG. 13 is an example of a flowchart which shows processing executed by the printer upon receipt of an exclusive command.

FIG. 13 shows the processing executed by the printer 20 which receives an exclusive command from the computer 10 (APL 14a) by means of a flowchart.

In S800, the printer 20 distinguishes the received exclusive command as any of an exclusive start command, an exclusive release command and a JOB information request command and divides up the processing in accordance with the type of command thus distinguished.

In cases where an exclusive start command is received, the printer 20 saves the I/F name via which the exclusive start command was received (or an ID or the like for uniquely identifying the I/F) in a specified storage area in S810. Although I/Fs other than the communication I/F 24 used for communications with the computer 10 (APL 14a) have been omitted from FIG. 1, the printer 20 comprises, in addition to the communication I/F 24, a variety of I/Fs which correspond with communications with an external instruction output source (PC or program or the like) other than the APL 14a. The printer 20 pre-assigns a number to each I/F and these numbers constitute I/F names. The exclusive start command received in S810 is received via the communication I/F 24 and, therefore, the printer 20 saves the number n pre-assigned to the communication I/F 24 in a specified storage area as the I/F name.

The 'interface' which the printer 20 comprises refers to the means, communication format or the like for implementing communication between the printer 20 and the output source of the instruction for the printer 20 by being interposed therebetween for each one to one relationship. Accordingly, such interfaces include not only hardware I/F such as a USB connector which connects the PC to the printer 20 but also software I/F which is used to exchange data between an instruction output source program and a program on the printer 20 side. In cases where the printer 20 communicates with a plurality of PCs and programs via one connector which corresponds with the TCP/IP format that the printer 20 comprises, the IP addresses and ports assigned to the respective instruction output sources are also included in the concept of an I/F.

In S820, the printer 20 saves attribute information which the exclusive start command comprises in a predetermined storage area. Attribute information as the meaning is intended here corresponds to the JOB name or the like assigned to a series of processes from printing to colorimetry which the APL 14a is to request of the printer 20 going forward. The APL 14a reports the JOB names and so forth by including the JOB name, user name, and PC host name or the like in cases where an exclusive start command is transmitted.

In cases where an exclusive release command is received, in S830, the printer 20 deletes the I/F name saved in the specified storage area. This deleted printer 20 saves JOB information which describes the content of the processing executed in accordance with each command received from the receipt of the exclusive start command until the receipt of the exclusive release command via the I/F (communication I/F 24) for the deleted I/F name in a predetermined storage device (S840). 'JOB information' refers to the time required from printing until the end of colorimetry, the number of sheets of printed matter, and the ink usage amount, and so forth. JOB information may also be saved in association with the JOB name saved in S820.

Figure 14:
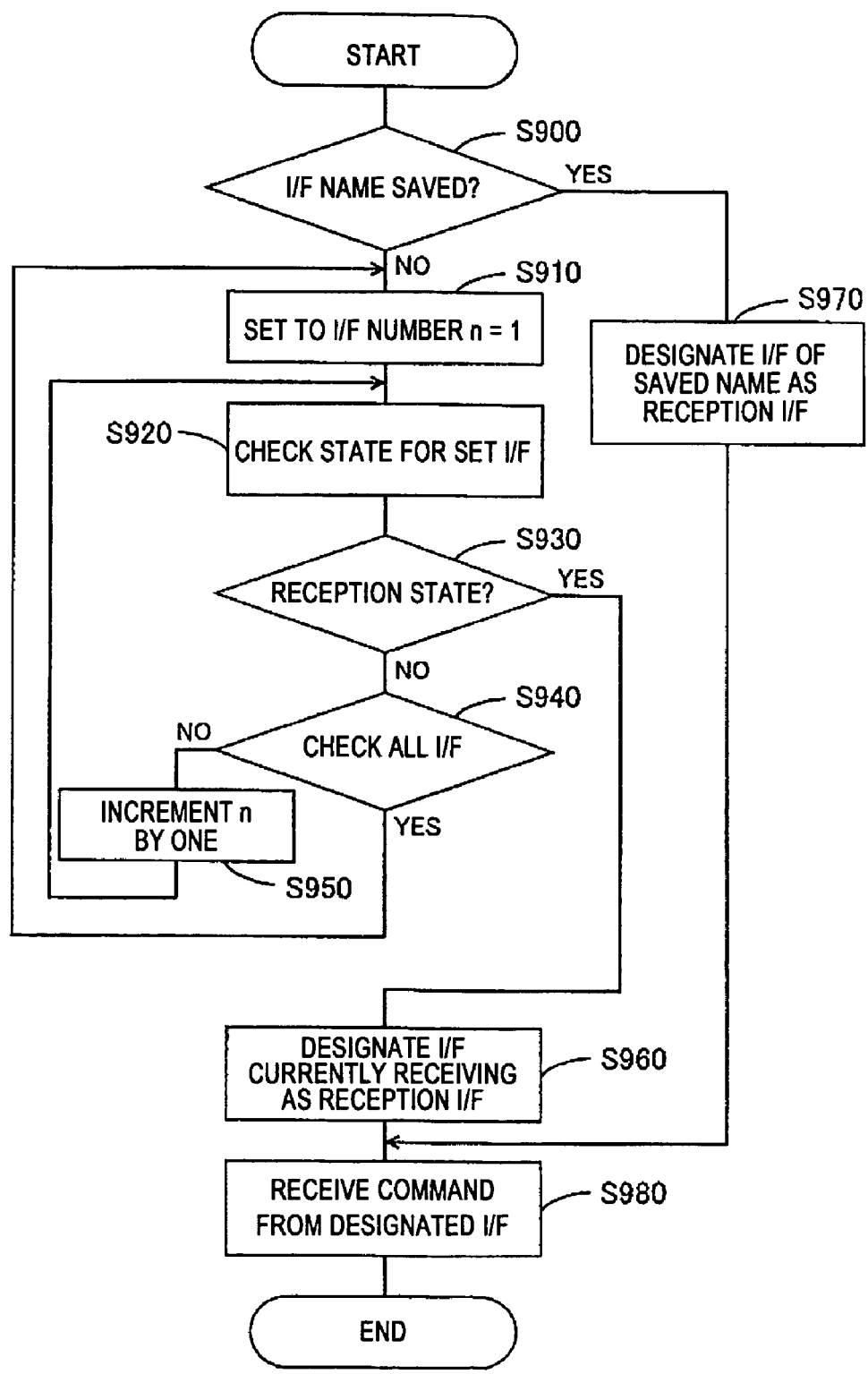
FIG. 14 is an example of a flowchart which shows the printer command receipt processing.

FIG. 14 shows the content of command receipt processing on the printer 20 side with respect to a transmission from the outside by means of a flowchart. This command receipt processing is the processing that is executed in S300 of FIG. 7.

The printer 20 continuously judges whether an I/F name has been saved in the specified storage area (S900) and, in cases where an I/F name has indeed been saved therein, the printer 20 designates the I/F pertaining to the saved I/F name as the reception I/F (S970) and receives a command only from the designated I/F (S980). That is, after receiving an exclusive start command from any instruction output source, the printer 20 saves the I/F name via which the exclusive start command was received and receives a command from the outside by using only the I/F pertaining to the saved I/F name. Such I/F restrictions continue unless an exclusive release command is received via the I/F pertaining to the saved I/F name and the I/F name is deleted from the predetermined storage area.

Thus, the APL 14a is able to monopolize the printer 20 reliably during the period from the transmission of the exclusive start command to the printer 20 (S105) to the transmission of an exclusive release command (S145). Therefore, all of the processing from the printing of the target image up until the acquisition of the colorimetry values for the colorimetry position pertaining to the above-mentioned designation can be executed continuously without permitting the interruption of a job by another instruction output source to which the printer 20 is connected.

In cases where a "No" judgment is obtained in S900, that is, in a situation where an exclusive start command is not received from any instruction output source, the printer 20 is also able to receive commands in order of arrival from any I/F. More specifically, the printer 20 sets the I/F which is the target of a status check as the number 1 I/F (S910) and checks the state of the set I/F (S920). In cases where it is judged that the state is a state where data have been received from the outside (Yes in S930), the printer 20 designates the I/F during reception as the reception I/F (S960) and receives a command from the outside via the designated I/F. However, in cases where the judgment of S930 yields a "No", it is judged that an ordinary state check is completed for all of the I/F starting from number one (S940). In cases where an ordinary state check for all of the I/F is not completed, the setting of the check target I/F number is incremented by one (S950), whereupon the processing returns to S920 and, in cases where an ordinary check is completed (Yes in S940), the processing returns to S910 and the state check is repeated starting with the I/F whose number is 1.

Let us now return to the description of FIG. 13. In cases where a JOB information request command is received, the printer 20 transmits the JOB information requested by the request command to the source of the request in S850. Suppose that the JOB information request command specifies the JOB name of the requested JOB information. On the printer 20 side, JOB information that has been saved in the storage area in association with the JOB name specified by the received JOB information request command is extracted and the extracted JOB information is transmitted to the computer 10. As a result, on the computer 10 side, a variety of information on the specified JOB pertaining to the series of processes from the printing of an image to colorimetry can be acquired.

A situation where, after the APL 14a has transmitted an exclusive start command, an error is produced in the computer 10 or APL 14a due to a variety of factors and the APL 14a is unable to transmit the exclusive release command to the printer 20 may also be considered. Therefore, in cases where a predetermined period (a period which is set as the time which is sufficient to end the printing, colorimetry, and evaluation of the set number of target images, for example) has elapsed after receiving the exclusive release command, the printer 20 may voluntarily generate a reset signal. In cases where the reset signal is generated, the printer 20 regards this situation as the same situation as a case where the exclusive release command has been received and deletes the I/F name saved in the specified storage area. Furthermore, the printer 20 may also delete the I/F name saved in the specified storage area by generating the reset signal in cases where a predetermined operation is performed by the user after the exclusive start command is received in addition to or instead of a judgment based on the predetermined period elapsing. With a constitution of this kind, it is possible to prevent a situation where the printer 20 continues to be unfairly exclusive to one instruction output source. Moreover, the user is able to undo a state where the printer 20 is used exclusively by the APL 14a easily with the desired timing.

3. Further Embodiments

The computer 10 is able to acquire the following, for example, in addition to acquiring the reference color values in response to a user input via the application screen 18a1.

By causing the printer 20 to perform colorimetry on the colorimetry values of color samples (color chips) which constitute the reference colors for colors of the colorimetry position of the above designation, the computer 10 may also input the colorimetry values of the color samples and set the colorimetry values thus input as the reference color values. In this case, the user sticks the color samples prepared to represent the ideal colors for the colors in the colorimetry positions designated on the thumbnail display 18a11 in predetermined positions on the oblique surface 29a of the printer 20 and below the movement path of the color detection section 26a1 and operates the computer 10 after making these preparations. The computer 10 transmits a colorimetry instruction for the color samples to the printer 20 and the printer 20, having received the colorimetry instruction, performs colorimetry on the color sample by moving the colorimetry section 26*a* and transmits the colorimetry results (Lab data) to the computer 10. The computer 10 is able to display the received colorimetry results for the color sample in the input field 18*a*14 of the application screen 18*a*1. With a constitution of this kind, the computer 10 is prevented from identifying erroneous reference color values due to inputting errors by the user to the input field 18*a*14 and the computer 10 is able to reliably acquire reference color values which constitute the ideal values for the colors of the colorimetry positions of the above designation.

In addition, the computer 10 may generate and acquire the reference color values on the basis of the image data 14*c* which represent the target image. The computer 10 generates the reference color values on the basis of the component values (RGB data) of the image data 14*c* pertaining to the colorimetry positions upon receipt of the colorimetry position designation via the application screen 18*a*1. More specifically, the computer 10 converts the RGB data pertaining to the designated colorimetry positions among the RGB data which the respective pixels of the image data 14*c* possess into Lab data by referencing a profile or the like which prescribes the conversion relationship between the sRGB color system and the Lab color system, and sets the Lab data obtained as a result of this conversion as the reference color values. The computer 10 is able to display the reference color values in the input field 18*a*14 of the application screen 18*a*1. With a constitution of this kind, it is possible to prevent the erroneous identification of reference color values resulting from inputting errors by the user and the computer 10 is able to reliably acquire reference color values for the colors in the colorimetry positions of the above designation. The computer 10 may save the profile beforehand in a predetermined recording region of the HD 14 or the like or may download the profile from an external server or the like.

In cases where colorimetry positions are optionally designated by the user on the thumbnail display 18*a*11, actually designating a position which is slightly displaced from the position in which the user truly desires the colorimetry as the colorimetry position may also be considered due to the user ineptitude with the mouse operation or the like. Therefore, the computer 10 may display an enlarged image of the neighborhood of the colorimetry position of the designation in a predetermined position of the application screen 18*a*1.

Figure 15:
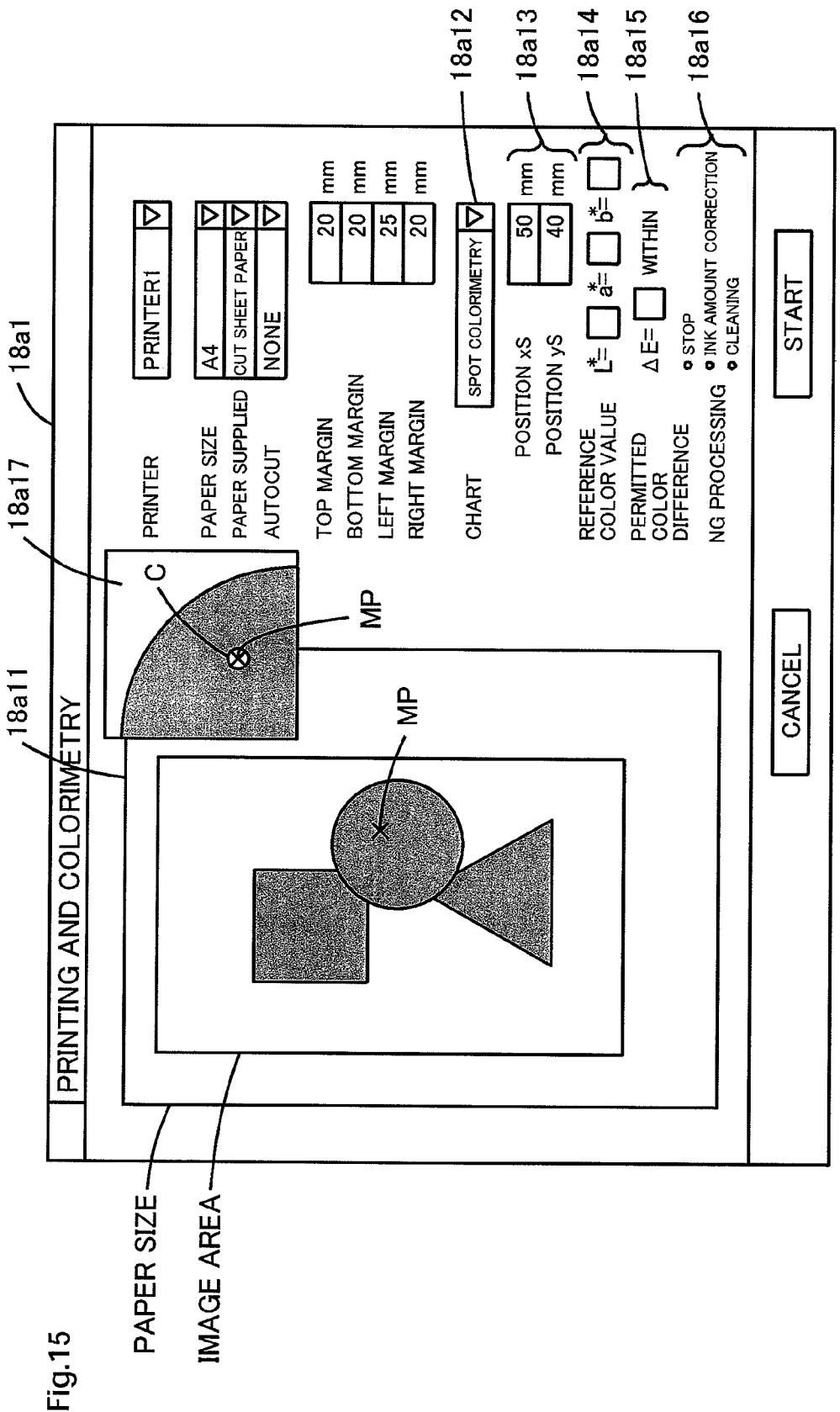
FIG. 15 is an example of a view which shows an example of an application screen.

FIG. 15 shows another example of the application screen.

An aspect in which a restricted range which includes the position of a mouse pointer MP on the thumbnail display 18*a*11 is represented by an enlarged display 18*a*17 is shown in addition to the thumbnail display 18*a*11 which represents the whole target image on the application screen 18*a*1 of FIG. 15. In addition, a planned colorimetry range C which is centered on the mouse pointer MP is shown within the enlarged display 18*a*17. The planned colorimetry range C shows the size of the range of detection by the color detection section 26*a*1. The computer 10 provides the enlarged display 18*a*17 and a display of the planned colorimetry range C in cooperation with the movement of the mouse pointer MP on the thumbnail display 18*a*11, for example. If this enlarged display 18*a*17 and the display of the planned colorimetry range C are executed, because it is then possible to clearly recognize which position on the image the user himself is trying to designate, the color on the image for which colorimetry is actually desired can be reliably designated.

Furthermore, in light of a comparison of the colorimetry results of the designated colorimetry position with the reference color values and an evaluation thereof, it can be said that it is desirable for a position which is designated as a colorimetry position to be a location on the image which is free of color change or substantially free of color change. Therefore, the computer 10 may also judge whether the colors of the pixels in the planned colorimetry range C are substantially fixed. This judgment can also be performed based on whether the difference between the respective pixels of the RGB values within the planned colorimetry range C (difference between R values, difference between B values, and difference between G values) lie within a predetermined threshold value, for example. Furthermore, in cases where it is judged that the colors of the pixels within the planned colorimetry range C are substantially not fixed, the computer 10 may inform the user that the designation of the current position of the mouse pointer MP as a colorimetry position is not suitable by displaying a warning or the like. If this processing is executed, the designation of a position with a large degree of color change as in a case where a color changes to a gradational form, for example, as a colorimetry position can be prevented.

In the first embodiment above, a case where a certain single target image is printed a predetermined number of times was described. However, the constitution of the present invention can also be applied to a case where a plurality of target images with mutually different designs or the like are printed and subjected to colorimetry as in the case of a publication with color printing that spans a plurality of pages. In this case, the computer 10 inputs colorimetry positions and reference color values (depending on the case, also the permitted color difference ΔE) via the application screen or acquires same, for each target image. Further, each time one page's worth of a target image is printed, the printer 20 causes the colorimetry section 26*a* to perform colorimetry in the colorimetry positions designated on the page. The computer 10 compares and evaluates the colorimetry result with the reference color values acquired for the page. The computer 10 allows the printer 20 to print the target image of the next page if the evaluation results are favorable and allows the printer 20 to print the target image of the same page once again after executing a restore operation or the like for the printer 20 if the evaluation results are poor. With a constitution of this kind, printing, colorimetry, and evaluation can be carried out continuously for a plurality of target images whose content is different from one page to the next and a favorable printing result can ultimately be obtained for all of the target images.

Although the drying processing prior to performing spot colorimetry on a target image printed on a print medium is basically natural drying in the first embodiment, this does not mean that there is absolutely no scope for forced drying using dryer 26*d*. The computer 10 may also transmit a forced drying command to the printer 20 as a drying command in S510 of FIG. 10. In cases where it is judged that the drying command is not a natural drying command in S315 (See FIG. 7), the printer control IC 25 of the printer 20 reads the colorimetry position (xS, yS) saved in S310 and finds the conveyance distance D3 of the print paper which will serve to match the colorimetry position (xS, yS) closest to the head of the print paper with the dryer 26*d* by means of Equation (3).

$$D3 = dHM + dMD - (yH - yS) \quad (3)$$

As shown in FIG. 11, dMD is the distance between the colorimetry section 26*a* (color detection section 26*a*1) in the paper feed direction and the center position of the drying range HR. dMD is a fixed value based on the product design of the calorimetric drying unit 28 and the printer 20 possesses a fixed value dMD as data.

The printer control IC 25 transmits a forced drying command to the calorimetric control IC 26 after causing the paper feed mechanism 25d to execute processing to convey the print paper in accordance with the conveyance distance D3. In cases where the received command is a forced drying command, the calorimetric control IC 26 controls the driving of the dryer 26d in accordance with the drying time and the temperature and strength of the warm air and so forth which are prescribed by the command and forcibly controls the part conveyed below the drying range HR of the print paper. During the forced drying, the calorimetric control IC 26 may issue an instruction to the presser plate drive mechanism 26c to press the print paper by means of the presser plate. In cases where a plurality of colorimetry positions are designated as shown in FIG. 11, the printer 20 repeats the calculation of the print paper conveyance distance and the conveyance over this distance, as well as the forced drying after the conveyance by taking the respective colorimetry positions as the targets.

In cases where the drying command is a forced drying command, the processing of the S350 and S355 in FIG. 7 also differs from that of the first embodiment. After the forced drying, all of the colorimetry positions (xS, yS) on the print paper are further downstream in the paper feed direction than the colorimetry section 26a. Hence, in S350, the colorimetry positions (xS, yS) are selected in order starting from the lower end of the print paper. In S355, the conveyance distance D1 of the print paper which serves to match the colorimetry positions (xS, yS) selected in S350 with the position of the colorimetry section 26a is calculated. The conveyance distance D1 for the colorimetry position closest to the lower end of the print paper ('MS3' with reference to FIG. 11) is D1=-dMD. The minus sign as it is intended here signifies the fact that the paper is conveyed (backfed) in the opposite direction from the paper feed direction. The conveyance distance D1 for the colorimetry positions whose proximities to the lower end of the print paper fall in second and subsequent places (MS2 and MS1 with reference to FIG. 11) is the distance in the paper feed direction from the colorimetry position which has just been subjected to colorimetry and the paper is backfed over this distance. Thus, in cases where the colorimetry positions (xS, yS) are subjected to colorimetry, a predetermined range which includes colorimetry positions (xS, yS) can be dried by means of the dryer 26d in the run-up to the colorimetry processing. In this case, because the parts which have been forcibly dried on the printed target image and parts which have not been forcibly dried exist coexist, there can be a slight problem with the image quality. However, in cases where there is a desire to subject the respective colorimetry positions (xS, yS) to colorimetry in a shorter time than in a case where natural drying is performed, the forced drying above is an effective treatment.

4. Summary

According to this embodiment, the computer 10 receives colorimetry positions which are optionally designated on the thumbnail display 18a11 of the target image shown on the application screen 18a1, the reference color values, and the permitted color difference ΔE and transmits a print command, colorimetry position definition command, drying command, and colorimetry command to the printer 20 which comprises the colorimetry function, and the printer 20 prints the target image on the print medium in accordance with the print command, dries the target image in accordance with the drying command, automatically calculates the print paper conveyance distance on the basis of information on the colorimetry position (xS, yS) on the print paper defined by the colorimetry position definition command, conveys the print paper to the colorimetry section 26a in accordance with the distance thus calculated, calculates the movement distance of the colorimetry section 26a on the basis of the information of the colorimetry position (xS, yS), and causes the colorimetry section 26a to perform colorimetry after moving the colorimetry section 26a in accordance with the movement distance thus calculated. That is, if this embodiment is employed, the user is able to execute a series of work processes such as the printing and drying of an image and the acquisition of colorimetry values in the positions which are selected according to the user's own taste among the respective positions on the image accurately and in a short time automatically after a predetermined entry operation has been made to the application screen 18a1. Moreover, in the above series of work processes, because the APL 14a of the computer 10 has exclusive usage of the printer 20, the series of work processes are not suspended due to an interruption by another instruction output source.

In addition, this embodiment is particularly effective for the following reasons.

According to this embodiment, the user is able to designate colorimetry positions on the image according to their tastes and the designated positions are subjected to accurate colorimetry. Therefore, the colors of particularly important points in the image (the colors of a company logo in a poster or leaflet, for example) can be reliably subjected to colorimetry and the colors can be evaluated. That is, because it is possible to judge whether the printed matter can be printed using the ideal colors by evaluating the colors of particularly important points in the image, the results of the color evaluation are highly reliable.

Furthermore, conventionally, in cases where the colors of an image printing result are evaluated, the charts which are to be used for the color evaluation have often been printed simultaneously on the same paper together with the intended image and it has been judged whether the printing result of the object image is favorable on the basis of the colorimetry result of this chart. However, according to the present invention, optional positions of a printed target image can be directly subjected to colorimetry and the colors of the target image can be evaluated. Hence, there is no need to print the chart together with the intended image. In cases where the final deliverable such as a poster or leaflet is printed, it is not preferable to print the charts together on the paper and it is also difficult to secure a blank space. Hence, this embodiment is very effective in cases where the final deliverable is printed and undergoes a color evaluation. Naturally, it goes without saying that, if the constitution of this embodiment is employed, in addition to a poster, leaflet, and a publication which spans a plurality of pages, printing of all images such as images which contain charts and single chart images can be printed and optional positions on the image can be designated and subjected to colorimetry.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A printing colorimetric instruction method, comprising:
   receiving a designation for a colorimetry position on a predetermined image;

instructing to print an image on a print medium on the basis of image data which represent the predetermined image;

determining a position when a colorimetry section is caused to perform colorimetry on the predetermined image printed on the print medium on the basis of the designation;

acquiring a colorimetry value of the colorimetry position of the designation by causing the colorimetry section to execute colorimetry on the basis of the position thus determined;

acquiring a reference value for the color of the colorimetry position of the designation, and comparing the colorimetry value with the reference value, and judging whether the color of a printing result of the colorimetry position of the designation is normal on the basis of the comparison result;

wherein, in cases where judging that the color of the printing result for the colorimetry position of the designation is not normal, instructing to print an image on the print medium on the basis of the image data once again after executing a instruction to restore operation on a print head used in the printing and/or correction processing to correct, in accordance with the comparison result, an ink amount discharged by the print head on the basis of the image data.

2. The printing colorimetric instruction method according to claim 1, wherein performing a thumbnail display of the image on a predetermined input screen, and receiving a colorimetry position optionally selected on the thumbnail display.

3. The printing colorimetric instruction method according to claim 1, wherein acquiring a permitted range of a difference between the colorimetry value for the colorimetry position of the designation and the reference value; and judging that the color of the printing result for the colorimetry position of the designation is normal in cases where the difference between the colorimetry value acquired by causing the colorimetry section to execute colorimetry and the reference value is within the permitted range.

4. The printing colorimetric instruction method according to claim 1, wherein causing the colorimetry section to perform colorimetry on a color sample constituting a reference color of the colorimetry position of the designation, and receiving a colorimetry value of the color sample, and setting the colorimetry value of the color sample as the reference value.

5. The printing colorimetric instruction method according to claim 1, wherein generating the reference value on the basis of a component value which corresponds with the colorimetry position of the designation in the image data.

6. A printer, comprising:

a reception section which receives a designation for a colorimetry position on a predetermined image;

a printing control section which prints an image on a print medium on the basis of image data which represent the predetermined image;

a determination section which determines a position when a colorimetry section is caused to perform colorimetry on the predetermined image printed on the print medium on the basis of the designation;

a conveyance section which conveys the print medium for which printing has been completed on the basis of the position thus determined; and a colorimetric control section which acquires a colorimetry value of the colorimetry position of the designation by causing the colorimetry section to execute colorimetry on the basis of the position thus determined;

acquires a reference value for the color of the colorimetry position of the designation, compares the colorimetry value with the reference value, and judges whether the color of a printing result of the colorimetry position of the designation is normal on the basis of the comparison result; and in cases where the color of the printing result for the colorimetry position of the designation is judged to be not normal, instructs to print an image on the print medium on the basis of the image data once again after executing a instruction to restore operation on a print head used in the printing and/or correction processing to correct, in accordance with the comparison result, an ink amount discharged by the print head on the basis of the image data.

\* \* \* \* \*